US010928540B2

(12) United States Patent
Wilson et al.

(10) Patent No.: US 10,928,540 B2
(45) Date of Patent: Feb. 23, 2021

(54) SYSTEMS AND METHODS FOR CHARACTERIZING MATERIALS EXTERNAL OF A CASING

(71) Applicant: Halliburton Energy Services, Inc., Houston, TX (US)

(72) Inventors: Glenn A. Wilson, Singapore (SG); Burkay Donderici, Houston, TX (US); Yan-Wah M. Chia, Singapore (SG); Krishna M. Ravi, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 481 days.

(21) Appl. No.: 15/576,672

(22) PCT Filed: Jun. 26, 2015

(86) PCT No.: PCT/US2015/038021
§ 371 (c)(1),
(2) Date: Nov. 22, 2017

(87) PCT Pub. No.: WO2016/209269
PCT Pub. Date: Dec. 29, 2016

(65) Prior Publication Data
US 2018/0136356 A1 May 17, 2018

(51) Int. Cl.
*G01V 3/26* (2006.01)
*E21B 47/01* (2012.01)
(Continued)

(52) U.S. Cl.
CPC ............. *G01V 3/26* (2013.01); *E21B 47/005* (2020.05); *E21B 47/01* (2013.01); *E21B 47/10* (2013.01);
(Continued)

(58) Field of Classification Search
CPC .. E21B 47/0005; E21B 47/10; E21B 47/1015; E21B 47/102; G01V 3/26; G01V 3/30
See application file for complete search history.

(56) References Cited

U.S. PATENT DOCUMENTS 4,980,642 A 12/1990 Rodney
8,316,936 B2 11/2012 Roddy et al.
(Continued)

FOREIGN PATENT DOCUMENTS

CA 2827763 8/2012
CA 2876482 5/2013
(Continued)

OTHER PUBLICATIONS

Morse et al., Chapter 11: "The Wave Equation," Methods of Theoretical Physics II, McGraw-Hill Book Company, Inc., 1953: pp. 1331-1583.
(Continued)

*Primary Examiner* — Michael J Dalbo
(74) *Attorney, Agent, or Firm* — Chamberlain Hrdlicka

(57) ABSTRACT

A method for use with a subterranean well can include modeling multiple fluid types in an annulus formed between casing and an earth formation penetrated by a wellbore, inverting electromagnetic data acquired by sensors in the well, and selecting at least one of the fluid types based on the inverting. A system for use with a subterranean well can include multiple sensors longitudinally spaced apart along a casing in a wellbore, each of the sensors imparting electromagnetic impulses to a fluid present in an annulus formed between the casing and the wellbore, and each of the sensors providing observed data indicative of at least one physical property associated with the fluid.

22 Claims, 12 Drawing Sheets

(51) Int. Cl.

| | | |
|---|---|---|
| *G01V 3/30* | (2006.01) | |
| *E21B 47/005* | (2012.01) | |
| *E21B 47/11* | (2012.01) | |
| *E21B 47/113* | (2012.01) | |
| *E21B 47/10* | (2012.01) | |
| *G01V 99/00* | (2009.01) | |

(52) U.S. Cl.
CPC ........... *E21B 47/111* (2020.05); *E21B 47/113* (2020.05); *G01V 3/30* (2013.01); *G01V 99/005* (2013.01)

(56) References Cited

U.S. PATENT DOCUMENTS

| | | | |
|---|---|---|---|
| 8,789,587 B2 | 7/2014 | Tubel et al. | |
| 2002/0040274 A1* | 4/2002 | Yin | G01V 3/38 702/7 |
| 2003/0126921 A1 | 7/2003 | Zisk et al. | |
| 2005/0194182 A1* | 9/2005 | Rodney | E21B 47/12 175/24 |
| 2007/0040557 A1 | 2/2007 | Johnstad et al. | |
| 2009/0043554 A1* | 2/2009 | Horne | G01V 3/083 703/10 |
| 2011/0199228 A1* | 8/2011 | Roddy | E21B 33/13 340/856.4 |
| 2013/0030708 A1* | 1/2013 | Forgang | G01V 3/24 702/11 |
| 2014/0180592 A1 | 6/2014 | Ravi et al. | |
| 2014/0182845 A1 | 7/2014 | Roberson et al. | |
| 2014/0338896 A1* | 11/2014 | McGarian | E21B 47/0005 166/250.08 |
| 2017/0204719 A1* | 7/2017 | Babakhani | E21B 47/0005 |

FOREIGN PATENT DOCUMENTS

| | | |
|---|---|---|
| WO | 2011006083 | 1/2011 |
| WO | 2015051222 A1 | 4/2015 |
| WO | 2015160347 | 10/2015 |
| WO | 2015199648 | 12/2015 |
| WO | 2016032677 | 3/2016 |
| WO | 2016108904 | 7/2016 |

OTHER PUBLICATIONS

Morse et al., Chapter 13: "Vector Fields," Methods of Theoretical Physics II, McGraw-Hill Book Company, Inc., 1953: pp. 1759-1901.

Vozoff et al., "Joint Inversion of Geophysical Data," Geophys. J. R. astr. Soc., 1975, vol. 42: pp. 977-991.

Zhdanov, Section 1: "Forward and inverse problems in geophysics," Geophysical Inverse Theory and Regularization Problems, Methods in Geochemistry and Geophysics, 36, Elsevier, New York, 2002: pp. 3-28.

International Search Report and Written Opinion of PCT Application No. PCT/US2015/038021 dated Mar. 11, 2016: pp. 1-17.

Bittar et al., "A Modem Microwave Formation Evaluation Sensor and Its Applications in Reservoir Evaluation," SPWLA 51st Annual Logging Symposium, Jun. 2010: pp. 1-10.

Cox et al., "3D lithological inversion of geophysical data," SEG Las Vegas 2012 Annual Meeting, 2012: pp. 1-5, <http://dx.doi.org/10.1190/segam2012-0753.1>.

Habashy et al., "Beyond the Born and Rytov Approximations: A Nonlinear Approach to Electromagnetic Scattering," Journal of Geophysical Research, Feb. 1993, vol. 98(B2): pp. 1759-1775.

Jupp et al., "Stable Iterative Methods for the Inversion of Geophysical Data," Geophys. J. R. astr. Soc., 1975, vol. 42: pp. 957-976.

Zhdanov et al., "Multinary Inversion for Tunnel Detection," IEEE Geoscience and Remote Sensing Letters, Sep. 2013, vol. 10(5): pp. 1100-1103.

* cited by examiner

TAG 1 POSSIBLE POSITIONS

TAG 2 POSSIBLE POSITIONS

SYSTEMS AND METHODS FOR CHARACTERIZING MATERIALS EXTERNAL OF A CASING

TECHNICAL FIELD

This disclosure relates generally to system utilized and operations performed in conjunction with a subterranean well and, in some examples described below, more particularly relates to electromagnetic methods of sensing and characterizing fluids in an annulus formed between casing and a formation.

BACKGROUND

It can be useful to know what fluid type(s) is/are present at one or more locations in a well. For example, after a cementing operation has completed, cement (and not drilling fluid or spacer fluid) should be present in the annulus formed between casing and the surrounding formation. As another example, in a production operation, it can be useful to know a hydrocarbon to water ratio produced from each production zone of a well, and it can be useful to know whether certain fluids have infiltrated cement in the well. Accordingly, it will be appreciated that improvements are continually needed in the art of determining fluid type in wells.

DETAILED DESCRIPTION

Figure 1:
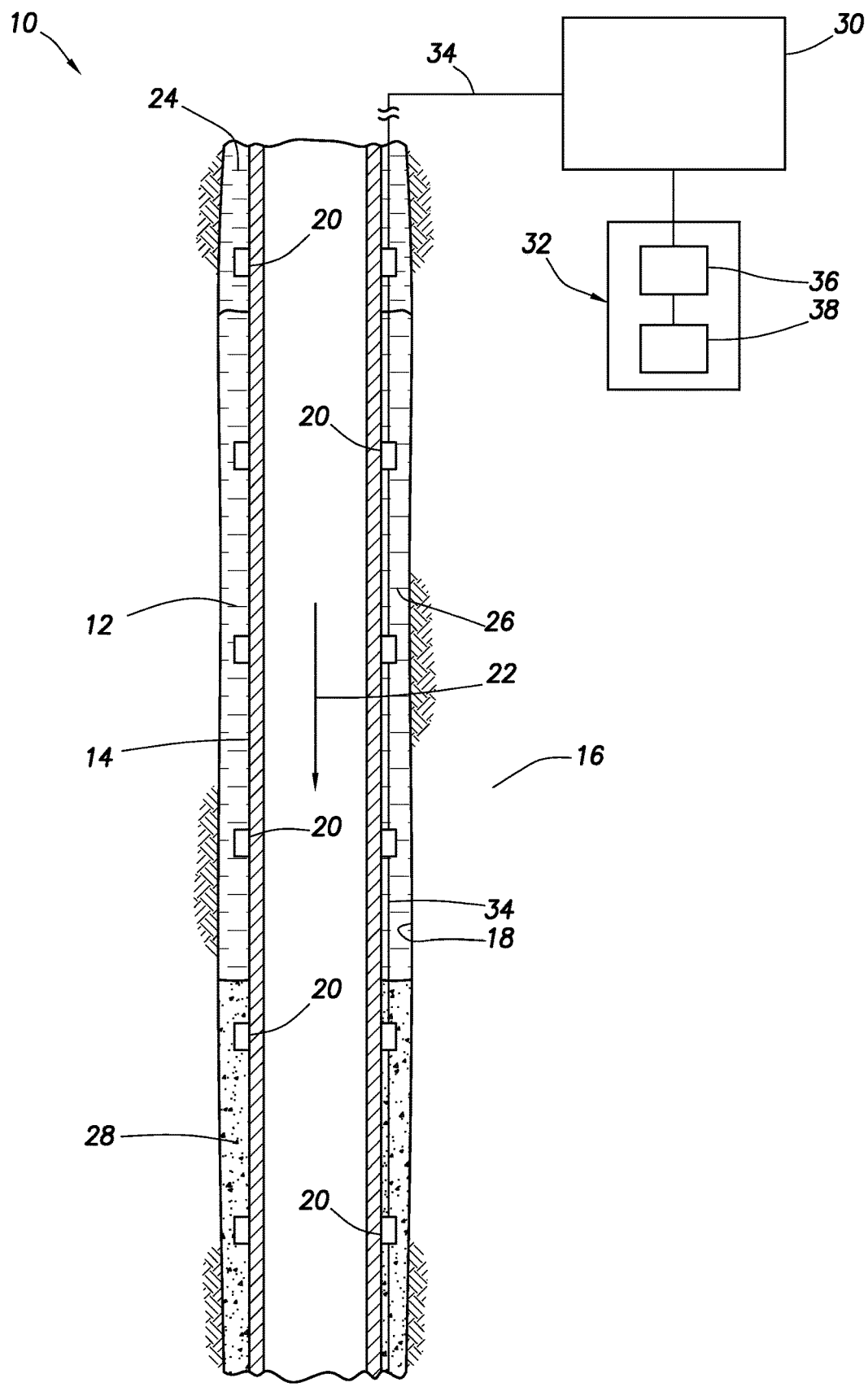
FIG. 1 is a representative partially cross-sectional view of a well system and associated method which can embody principles of this disclosure.

Representatively illustrated in FIG. 1 is a system 10 for use with a well, and an associated method, which system and method can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

The system 10 and method examples described utilize inversion to estimate quantitative models of the physical properties of fluids in an annulus formed between a casing and a formation. The inversion is performed on observed data, combined with a priori knowledge of, for example, characteristics of specific fluid types in a well, well geometry, casing equipment, and related material properties, etc.

In a typical inversion process, a quantitative model is estimated, the model is tested using misfit and acceptability criteria, the model is iteratively perturbed, the model is again tested, until the quantitative model produces predicted data acceptably "close" to the observed data. Typically, forward modeling is used to generate the predicted data from the estimated quantitative model. Examples described below can improve upon, or at least deviate from, this typical inversion process.

Inverting Electromagnetic Data for Fluid Properties

In one embodiment, the system 10 provides for measuring and monitoring of fluids in an annulus 12 of a well formed between a casing 14 and an earth formation 16 penetrated by a wellbore 18. In one embodiment, the method provides for modeling, inversion and imaging for electromagnetic (EM) data acquired by the system 10 using EM sensors 20 distributed along the casing 14.

In one example, fluids 22 are flowed downwardly through the casing 14, and then upwardly through the annulus 12, during a cementing operation. Oil-based or water-based drilling fluid 24 is initially in place in the annulus 12 between the casing 14 and the formation 16. A spacer fluid 26, and then cement 28 (typically as a slurry), are subsequently pumped through the casing 14 and into the annulus 12.

The cement 28 slurry displaces the spacer fluid 26, which in turn displaces the drilling fluid 24. The cement 28 is allowed to set in the annulus 12, thereby sealing off the annulus and securing the casing 14 in the wellbore 18.

As used herein, the term "casing" is used to indicate a protective wellbore lining. Casing can be in forms known to those skilled in the art as casing, liner or tubing. Casing can be made of metals or non-metals. Casing can be segmented or continuous. Casing can be pre-formed or formed in situ. Thus, the scope of this disclosure is not limited to use of any particular type of casing.

As used herein, the term "cement" is used to indicate a material that hardens, cures or "sets" in a well to thereby seal off a space. Cement can be used to seal off an annulus between a casing and a wellbore, or can be used to seal off an annulus between two tubulars. Cement can be used to seal off a passage in a tubular. Cement is not necessarily cementitious, since cements can be made up of polymers (such as epoxies, etc.) and/or other materials, which can harden due to passage of time, exposure to elevated temperature, exposure to other substances, etc. Thus, the scope of this disclosure is not limited to use of any particular type of cement.

Contamination of the cement 28 with the drilling fluid 24 or spacer fluid 26 can have significant negative consequences for curing and integrity of the cement, and can provide potential conduits for future flow behind casing. Thus, the cement's structural integrity and sealing ability can be affected by the presence of other fluids in the annulus 12 while the cement is hardening therein.

In order to diagnose and assess a quality of the cement 28 during and after placement, as well as during a life of the well (e.g., due to exposure to $CO_2$, acidizing, hydraulic stimulation, etc.), multiple EM sensors 20 are deployed along the casing 14, for example, adjacent to the fluids 24, 26, 28 in the annulus 12 between the casing and the formation 16.

Fluids are characterized by dielectric properties including but not limited to conductivity (or resistivity), permittivity, and/or induced polarization (IP) parameters. The fluids may also be characterized by an actual or effective magnetic permeability. Typically, these EM properties of a fluid are isotropic and frequency-dependent.

Differences in dielectric properties of the different fluids 24, 26, 28 results in measurable changes in EM signals sensed by the EM sensors 20. The EM sensors 20 in this example can transmit, receive, process and telemeter signals to a telemetry unit 30 and computer 32 located, for example, at the earth's surface, on an offshore rig, at a subsea facility, at a remote facility, etc.).

The telemetry unit 30 may be configured for wired and/or wireless communication with the sensors 20. For wired communication, the telemetry unit 30 may be connected to the sensors 20 via electrical conductors, which may be internal to, external to, or in a wall of the casing 14. Electrical power may be provided for operation of the sensors 20 via the conductors 34. EM, acoustic or any other form of wireless communication may be used, in which case the sensors 20 may be battery powered or supplied with electrical power by one or more downhole generators (not shown).

The computer 32 is used to control operation of the telemetry unit 30, and to record EM data received by the telemetry unit. The computer 32 in this example includes at least a processor 36 and memory 38. The processor 36 operates the telemetry unit 30, receives EM data from the telemetry unit and manipulates/processes that data. The memory 38 stores instructions for operation of the processor 36, and stores processed data. The processor 36 and memory 38 can perform additional or different functions in keeping with the scope of this disclosure.

In other examples, different types of computers may be used, and the computer 32 could include other equipment (such as, input and output devices, etc.). The computer 32 could be integrated with the telemetry unit 30 into a single instrument. Thus, the scope of this disclosure is not limited to use of any particular type or construction of computer or telemetry unit.

During the cementing operation, the EM sensors 20 are operated to generate EM data (indicative of EM signals sensed by the sensors) as the fluids 24, 26, 28 in the annulus 12 are displaced (e.g., during pumping) and/or emplaced (e.g., during cement curing). The EM data may be sampled and recorded at discrete time intervals. In a method described more fully below, the EM data is inverted for determining dielectric properties and/or type of fluids in the annulus 12.

Figure 2:
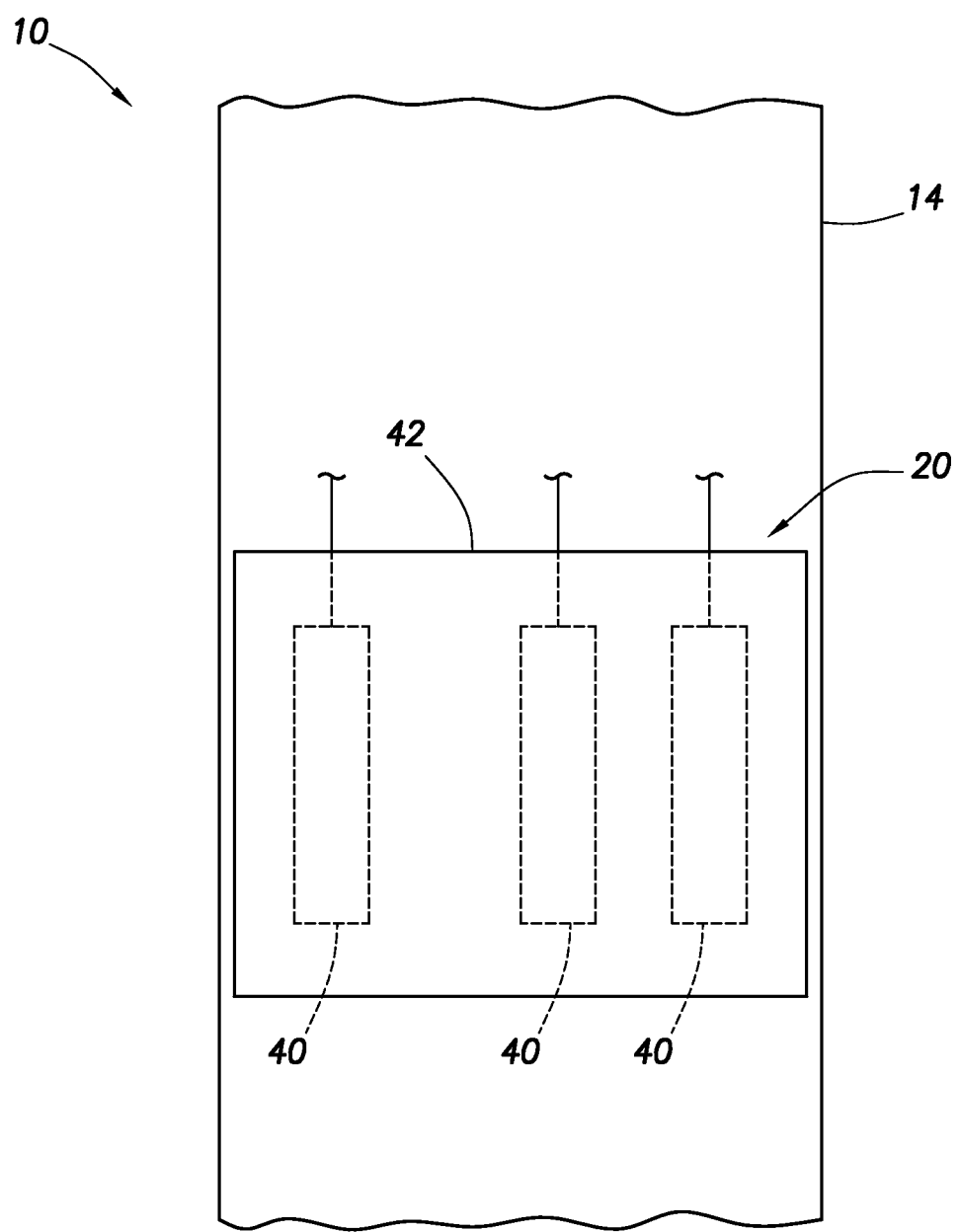
FIG. 2 is an enlarged scale representative side view of an example of an electromagnetic sensor that may be used in the system.

Referring additionally now to FIG. 2, an example of one of the EM sensors 20 is representatively illustrated on the casing 14 in the system 10. In this example, the sensor 20 includes three elongated parallel rectangular electrodes 40 that are not equally spaced apart. If the casing 14 is conductive, an insulating base layer (not shown) may be used between the electrodes 40 and the casing. An electrically insulating, abrasive resistant material 42 protects the electrodes 40 and insulates them from fluids external to the casing 14.

The EM sensor 20 operates by measuring the impedance and/or S-responses of the electrodes 40 in the presence of dielectric materials (such as fluids 24, 26, 28, see FIG. 1). That is, the impedance and/or S-responses measured at the electrodes 40 will change if a dielectric property of the proximal material changes.

For example, during a cementing operation, the EM sensor 20 is operated to generate EM data as the fluids 24, 26, 28 in the annulus 12 are displaced (e.g., during pumping) and/or emplaced (e.g., during cement curing). The EM data may be sampled and recorded at discrete time intervals. The EM data can be inverted to determine electrical properties of the fluids proximate the EM sensor 20 in the time intervals.

Note that use of the sensor 20 as depicted in FIG. 2 is not necessary in keeping with the principles of this disclosure. For example a suitable high frequency dielectric logging tool is marketed by Halliburton Energy Services, Inc. of Houston, Tex. USA. A wireline conveyed dielectric scanner is also marketed by Schlumberger of Houston, Tex. USA. Generally, these and similar tools measure one to four frequencies of high frequency electromagnetic (EM) data over a nominal range of 10 MHz to 3 GHz with depths of investigation (DOI) to approximately 4 inches (~10 cm). In these dielectric logging tools, phase and attenuation of an EM signal is measured between a pair of receivers, rather than impedance or S-parameters.

Figure 3A:
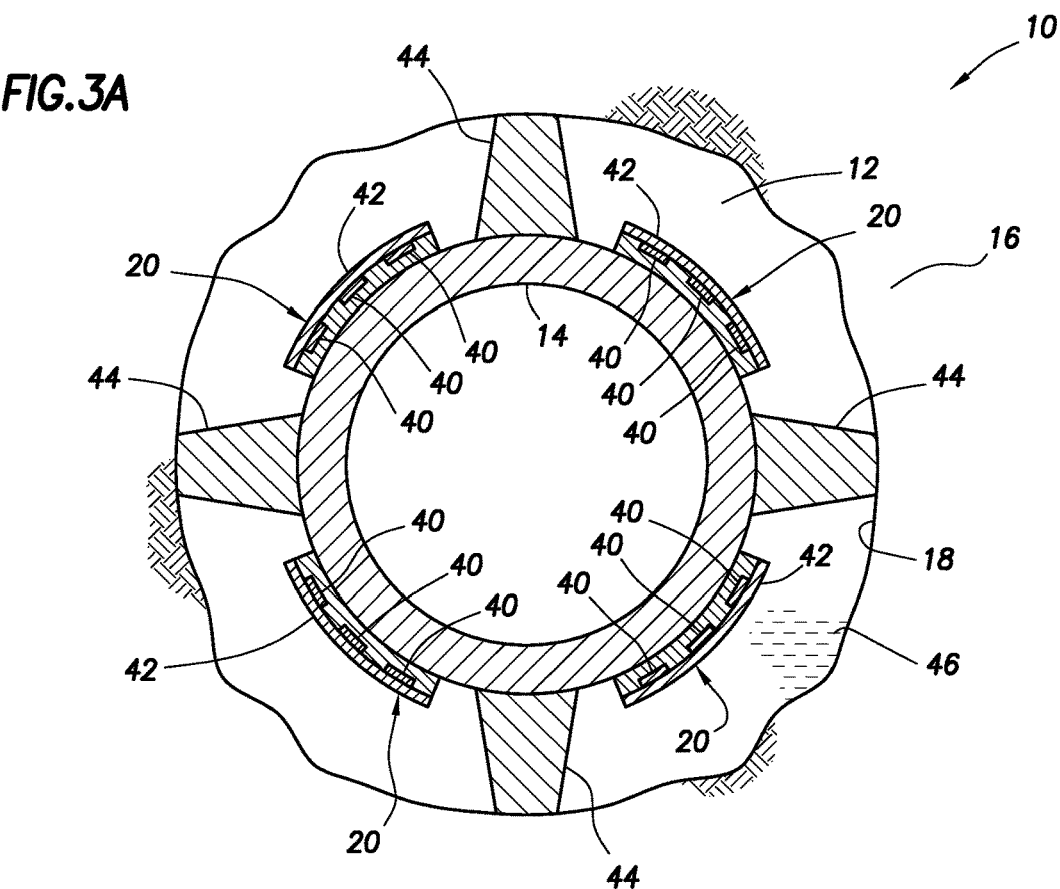
FIGS. 3A & B are representative cross-sectional views of another example the system, taken through multiple electromagnetic sensors.

Referring additionally now to FIG. 3A, a representative cross-sectional view of one example of the EM sensors 20 in the system 10 is representatively illustrated. In this example, four of the EM sensors 20 are circumferentially spaced apart about the casing 14 at one location, with centralizers 44 between adjacent pairs of the sensors.

This example provides a two-dimensional (2D) cross-section for a three-dimensional (3D) model that captures all geometric and component complexity, formation 16 conductivity, and has a uniform fluid 46 in the annulus 12. This model can be treated as a background conductivity model, whereby it is recognized conductivity may be complex to include dielectric terms.

Figure 3B:
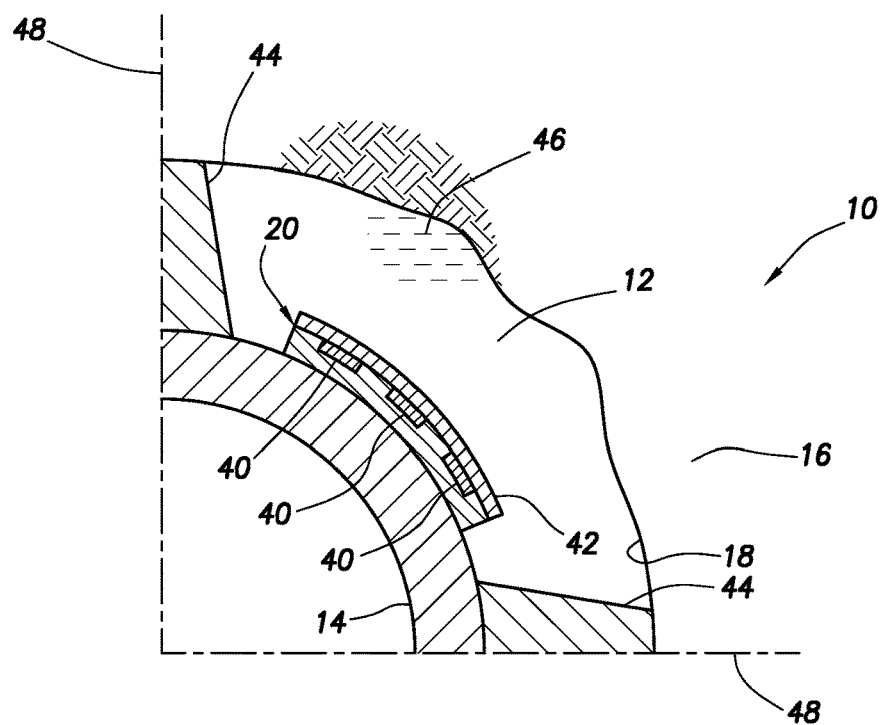

In FIG. 3B, the example of the 2D cross-section of the 3D model is representatively illustrated, wherein axes of symmetry 48 are exploited to reduce computational requirements, while still capturing all geometric and component complexity, formation 16 conductivity, fluid 46 type in the annulus 12, etc. Although this background conductivity model represents a 90 degree section of the FIG. 3A model, in other examples (e.g., with different axes of symmetry) different sections may be used, if desired.

Referring additionally now to FIGS. 4A-D, the FIG. 3B model is representatively illustrated, with electrical impulses being applied to different ports of the electrodes 40. The electrodes 40 are designated as terminals 1, 2 and 3 in FIGS. 4A-C. The formation has a conductivity of, whereby it is recognized conductivity may be complex to include dielectric terms In FIG. 4A, the impulses are applied at terminal 2 (a middle electrode 40) to the background conductivity model. S-parameters at terminals 1, 2 and 3 are calculated. Triaxial components of electric fields (radial, azimuthal and vertical components in cylindrical coordinates or x, y and z components in Cartesian coordinates) are calculated at discrete points in the quadrant of the annulus 12 formed between the casing 14 and the formation 16. These electric fields $S_{22}$, $S_{12}$, $S_{32}$ are referred to as the background electric fields.

Figure 4A:
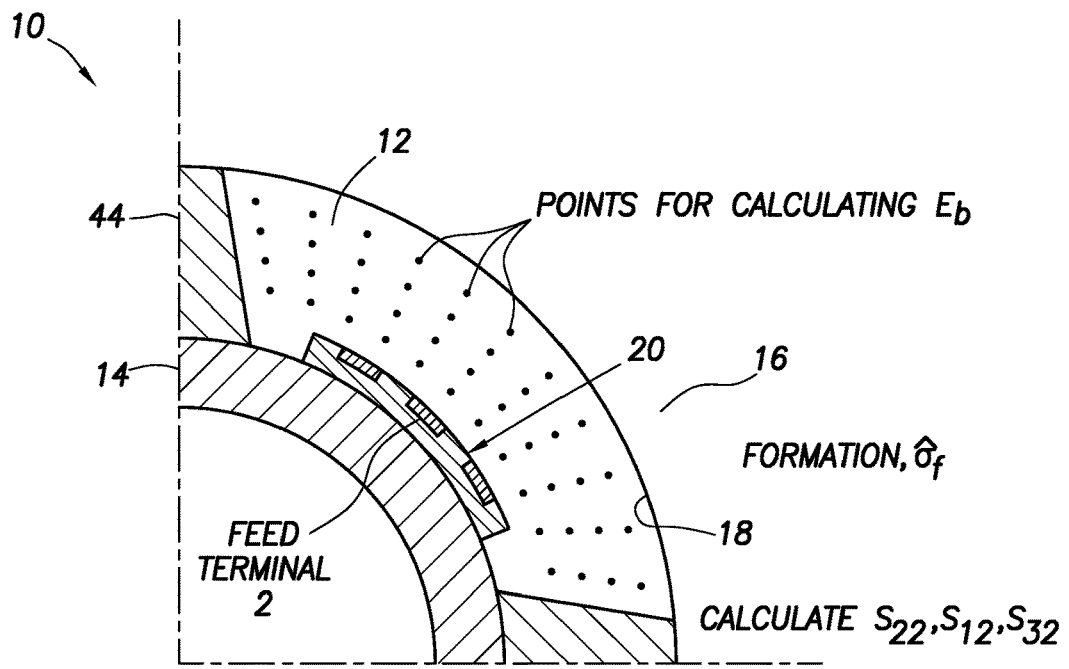
FIGS. 4A-D are representative cross-sectional views of an example of the system taken through a quadrant of an annulus between casing and an earth formation, indicating points for calculating electromagnetic field and Green's functions in the annulus, and discretization of the annulus.
Figure 4B:
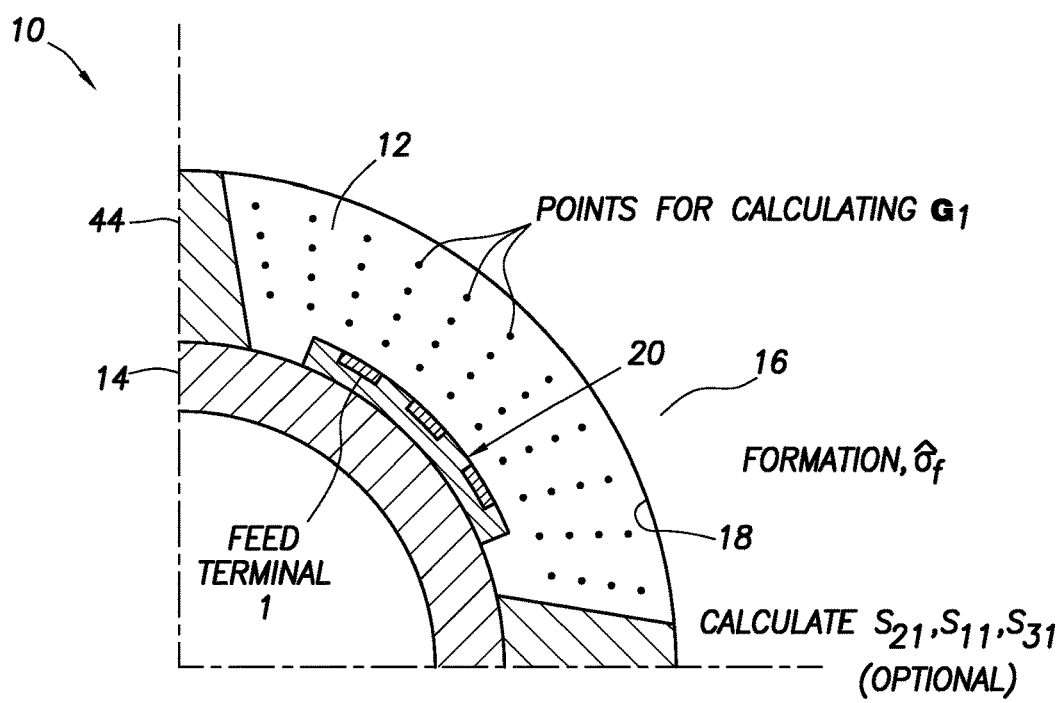

In FIG. 4B, the impulses are applied at terminal 1 to the background conductivity model. However, the calculated electric fields $S_{21}$, $S_{11}$, $S_{31}$ are identical to the Green's functions $G_1$ for the impulses applied at terminal 1.

Figure 4C:
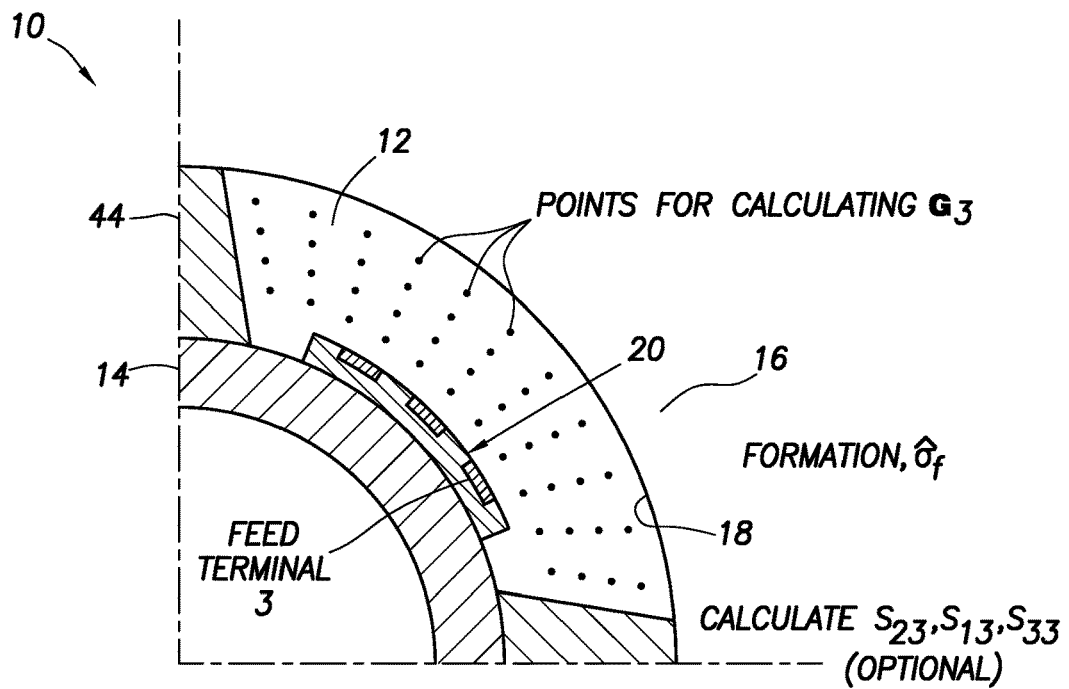

In FIG. 4C, the impulses are applied at terminal 3 to the background conductivity model. However, the electric fields are identical to the Green's functions $G_3$ for the impulses applied at terminal 3.

Figure 4D:
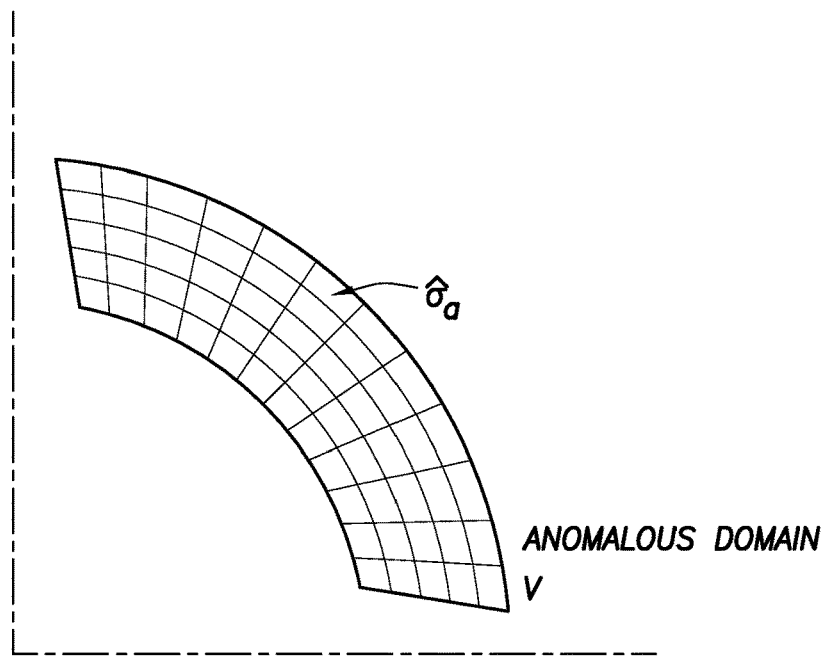

In FIG. 4D, an anomalous domain is defined in the quadrant of the annulus 12 formed between the casing 14 and the formation 16. An anomalous conductivity σa is defined for each portion of the anomalous domain, whereby it is recognized the anomalous conductivity may be complex to include anomalous dielectric terms.

Modeling

A distribution of the electrical properties in the annulus 12 can be assumed to be piecewise continuous. For example, a 3D model in cylindrical coordinates can be constructed as a juxtaposition of volume elements (e.g., tetrahedrals or hexahedrals) populated by discrete values of the electrical properties and the EM fields and/or sensitivities modeled using a 3D numerical simulator.

As mentioned previously, the electrical properties of the fluids can be expressed as a complex conductivity, $\hat{\sigma}$:

$$\hat{\sigma}(r) = \sigma'(r) + i\sigma''(r), \quad (1)$$

where σ' is the real part of the conductivity (related to dispersion or loss), and σ" is the imaginary part of the permittivity (related to the stored energy in the medium). Excluding induced polarization terms, the imaginary part of the conductivity has the form:

$$\sigma''(r) = \omega \in (r), \quad (2)$$

where ω is the angular frequency, and ∈ is the permittivity.

In what follows, a frequency-domain formulation is assumed. While the formulation is developed for a single frequency, application to multiple frequencies is assumed as a logical extension of partitioned vectors and matrices.

For the purpose of 3D EM modeling of the EM sensors 20 for investigation of fluids in the annulus 12, the 3D conductivity model can be separated into background (b) and anomalous (a) parts:

$$\hat{\sigma}(r) = \hat{\sigma}_b(r) + \hat{\sigma}_a(r), \quad (3)$$

which can (in general) be described by a second rank tensor:

$$\hat{\sigma} = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix}, \quad (4)$$

which, due to energy considerations, is symmetric.

Generally, the conductivity of a fluid is isotropic and frequency-dependent, and the conductivity of the formation 16 may be anisotropic and frequency-dependent.

The conductivity of the casing 14 is sufficiently high that it can be assumed isotropic. However, the casing 14 should be simulated with a magnetic permeability that may include hysteresis and anisotropy.

It follows that Maxwell's equations can separate the electric fields into background (b) and anomalous (a) parts:

$$E(r) = E_b(r) + E_a(r), \quad (5)$$

where the background fields are computed for the extraneous sources in the background conductivity model, and the anomalous fields are computed for scattering currents in the anomalous conductivity model. It is common practice that the background conductivity model is chosen such that the background fields may be evaluated analytically or semi-analytically for ideal sources to avoid excessive discretization of sources and related numerical instabilities. An ideal source could be an electric or magnetic dipole Arguably, the model depicted in FIG. 3B can be simulated with a layered background conductivity model. However, as we introduce geometric and component complexity to the model, solution of the background fields for non-ideal sources with analytical or semi-analytical methods becomes impractical. A non-ideal source could be microstrips, or geometrically complex induction coils. We can revert to total field solutions with computational full-wave EM solvers, such as finite-element (FE) or finite-difference (FD) or integral equation methods, or their hybrids. One advantage of such methods is that they can be formulated with an adaptive mesh algorithm that minimizes error. Such solvers have been realized in a variety of academic and commercial software (e.g., CST Microwave Studio, HFSS, Feko, etc.).

As depicted in FIG. 4A, an impulse source is applied at terminal 2. The fields and/or S-parameters at terminals 1, 2, and 3 are calculated. The triaxial components of the electric fields (radial, azimuthal, and vertical components in cylindrical coordinates or x, y, and z components in Cartesian coordinates) are calculated at discrete points in the quadrant of the annulus 12. These electric fields are referred to as the background electric fields. From reciprocity considerations, these electric fields can also be referred to as body-to-receiver Green's functions $G_2$ for terminal 2.

As depicted in FIG. 4B, an impulse source is applied at terminal 1. The triaxial components of the electric fields (radial, azimuthal, and vertical components in cylindrical coordinates or x, y, and z components in Cartesian coordinates) are calculated at the same discrete points in the quadrant of the annulus 12. From reciprocity considerations, these electric fields are referred to as the body-to-receiver Green's functions $G_1$ for terminal 1.

As depicted in FIG. 4C, an impulse source is applied at terminal 3. The triaxial components of the electric fields (radial, azimuthal, and vertical components in cylindrical coordinates or x, y, and z components in Cartesian coordinates) are calculated at the same discrete points in the quadrant of the annulus 12. From reciprocity considerations, these electric fields are referred to as the body-to-receiver electric Green's functions $G_3$ for terminal 3.

As depicted in FIG. 4D, the anomalous domain V is defined in the quadrant of the annulus 12. An anomalous conductivity $\hat{\sigma}(r)$ can be introduced. If it is assumed that the anomalous conductivity is a weak scatterer, then a component of the scattered electric field at a receiver terminal k can be calculated from the Born approximation:

$$E_a^k(r) = \int_V G_k(r',r) \cdot \hat{\sigma}_a(r) E_b(r) d^3r, \quad (6)$$

such that the electric field at a receiver terminal can be expressed as the sum of background and anomalous parts:

$$E^k(r') = E_b^k(r) + E_a^k(r') = E_b^k(r') + \int_V G_k(r',r) \cdot \hat{\sigma}_a(r) E_b(r) d^3r. \quad (7)$$

A transfer function exists that relates the electric field at the $k^{th}$ receiver terminal to the S-parameters of the $k^{th}$ receiver terminal:

$$S^k(r) = T_k E^k(r'). \quad (8)$$

In one embodiment, the Green's functions and background electric fields can be computed on a relatively fine mesh, where the positions of their computation are the points of Gaussian quadrature for numerically evaluating the volume integral in equation (6).

In another embodiment, the Green's functions and background electric fields can be computed on a relatively coarse mesh, and are interpolated (e.g., by polynomials or splines) to the points of Gaussian quadrature for numerically evaluating the volume integral in equation (6).

For time-lapse analysis, we calculate the difference between the S-parameters at two time intervals:

$$\Delta S^k(r') = S^k(r', t+\Delta t) - S^k(r', t) = T_k E^k(r', t+\Delta t) - T_k E^k(r', t). \quad (9)$$

From equation (7), we note that:

$$T_k E^k(r', t+\Delta t) - T_k E^k(r', t) = T_k \int_V G_k(r', r) \cdot [\hat{\sigma}_a(r, t+\Delta t) - \hat{\sigma}_a(r, t)] E_b(r) d^3 r, \quad (10)$$

and abbreviate:

$$\Delta \hat{\sigma}_a(r) = \hat{\sigma}_a(r, t+\Delta t) - \hat{\sigma}_a(r, t), \quad (11)$$

then:

$$\Delta S^k(r') = T_k \int_V G_k(r', r) \cdot \Delta \hat{\sigma}_a(r) E_b(r) d^3 r, \quad (12)$$

which is a linear equation relating the change in S-parameters with the time-lapse change in conductivity. This has an advantage that the Green's functions and background electric fields are time-lapse invariant.

In one workflow, assuming the time-lapse change in conductivity is uniform in the volume V (i.e., $\Delta \hat{\sigma}_a(r) = \Delta \hat{\sigma}_a$, there is 100% fluid substitution), we can write:

$$\Delta S^k(r') = T_k \Delta \hat{\sigma}_a \int_V G_k(r', r) \cdot E_b(r) d^3 r = T_k \Delta \hat{\sigma}_a \sum_{j=1}^{N} G_k^j \cdot E_b^j, \quad (13)$$

where N is the number of volume elements in the anomalous domain, $G_k^j$ is the N-length vector of volume integrated Green's functions, and $E_b^j$ is the N-length vector of background electric fields. Equation (13) is a linear equation between the change in S-parameters and the time-lapse change in conductivity.

In another workflow, assuming the time-lapse change in conductivity is not uniform in the volume V, we can write:

$$\Delta S^k(r') = T_k \int_V G_k(r', r) \cdot \Delta \hat{\sigma}_a(r) E_b(r) d^3 r = T_k \sum_{j=1}^{N} G_k^j \cdot \Delta \hat{\sigma}_a^j E_b^j, \quad (14)$$

where N is the number of volume elements in the anomalous domain, $G_k^j$ is the N-length vector of volume integrated Green's functions, $\Delta \hat{\sigma}_a^j$ is the N×N diagonal matrix of time-lapse change in conductivity, and $E_b^j$ is the N-length vector of background electric fields. Equation (14) is a linear function between the change in S-parameters and the time-lapse change in conductivity.

It is noted that a magnetic analog of equation (6) can be derived for the magnetic fields with body-to-receiver magnetic Green's functions.

Sensitivities

The sensitivities (or Fréchet derivatives or Jacobians) of the change in fields or S-parameters and the time-lapse change in conductivity is given by the differentiation of equation (12):

$$\frac{\partial \Delta S^k(r')}{\partial \Delta \hat{\sigma}_a(r)} = T_k \int_V G_k(r', r) \cdot E_b(r) d^3 r. \quad (15)$$

In one workflow, assuming the time-lapse change in conductivity is uniform in the volume V (i.e., $\Delta \hat{\sigma}_a(r) = \Delta \hat{\sigma}_a$, there is 100% fluid substitution), we obtain the sensitivities:

$$\frac{\partial \Delta S^k(r')}{\partial \Delta \hat{\sigma}_a} = T_k \int_V G_k(r', r) \cdot E_b(r) d^3 r = T_k \sum_{j=1}^{N} G_k^j \cdot E_b^j, \quad (16)$$

In another workflow, assuming the time-lapse change in conductivity is not uniform in the volume V, we obtain the sensitivities:

$$\frac{\partial \Delta S^k(r')}{\partial \Delta \hat{\sigma}_a^j} = T_k \int_{V_j} G_k(r', r) \cdot \Delta \hat{\sigma}_a(r) E_b(r) d^3 r = T_k G_k^j \cdot \Delta \hat{\sigma}_a^j E_b^j. \quad (17)$$

The sensitivities can be assembled into a M×N sensitivity matrix J, which has the elements:

$$J_{k,j} = \frac{\partial \Delta S^k(r')}{\partial \Delta \hat{\sigma}_a^j}. \quad (18)$$

From equations (1) and (2), we express the anomalous conductivity as:

$$\Delta \hat{\sigma}_a(r) = \Delta \hat{\sigma}_a(r) + i\omega \Delta \epsilon_a(r), \quad (19)$$

and have the partial derivatives:

$$\frac{\partial \Delta \hat{\sigma}_a(r)}{\partial \Delta \sigma_a(r)} = 1, \quad (20)$$

$$\frac{\partial \Delta \hat{\sigma}_a(r)}{\partial \Delta \epsilon_a(r)} = i\omega, \quad (21)$$

such that we can calculate the sensitivities with respect to conductivity and permittivity via the chain rule:

$$\frac{\partial \Delta S^k(r')}{\partial \Delta \sigma_a(r)} = \frac{\partial \Delta \hat{\sigma}_a(r)}{\partial \Delta \sigma_a(r)} \times \frac{\partial \Delta S^k(r')}{\partial \Delta \hat{\sigma}_a} = \frac{\partial \Delta S^k(r')}{\partial \Delta \hat{\sigma}_a}, \quad (22)$$

$$\frac{\partial \Delta S^k(r')}{\partial \Delta \epsilon_a(r)} = \frac{\partial \Delta \hat{\sigma}_a(r)}{\partial \Delta \epsilon_a(r)} \times \frac{\partial \Delta S^k(r')}{\partial \Delta \hat{\sigma}_a} = i\omega \frac{\partial \Delta S^k(r')}{\partial \Delta \hat{\sigma}_a}. \quad (23)$$

A similar process can be applied to other electrical parameters, e.g., various induced polarization parameters via analytic expressions, such as the Cole-Cole model and its variants.

In practice, we apply our inversion to multiple frequencies. However, the frequencies may be pre-selected on a priori knowledge of their sensitivity to downhole fluid substitution.

Inverting for Fluid Type

We can set the background permittivity in the annulus 12 to be 1, such that the anomalous permittivity $\Delta\epsilon_a$ is equal to the dielectric constant of the fluid.

In practice, the dielectric properties of each fluid (e.g., cement 28, spacer fluid 26, drilling fluid 24) can be characterized prior to operation, for example, with a dielectric probe and an appropriate analyzer. For example, from multiple samples of a fluid batch, the conductivity of each fluid can be characterized with a mean conductivity and a standard deviation from the mean conductivity.

The dielectric properties can also be measured by using an in-line probe that would measure the properties of the pure fluid near a wellhead and before entering the well.

Assuming that the fluids do not mix homogeneously, then inversion will obtain a continuum of conductivity values. Ideally, the inversion should constrain the conductivities within their a priori bounds.

For inversion, we can avoid constructing a stabilizing functional per Tikhonov regularization. Rather, we can truncate the Taylor series for a perturbation about a given vector of model parameters, m:

$$d = A(m) + J\Delta m, \quad (24)$$

where d is the vector of observed data, and A is the (generally) nonlinear forward operator. J is the sensitivity matrix defined previously. We solve for the vector of model parameter updates $\Delta m$ via the generalized inverse of the sensitivity matrix:

$$\Delta m = J^+[d - A(m)] = J^+ r, \quad (25)$$

where r is the vector of residual errors. The most stable and efficient manner of evaluating the generalized inverse of the sensitivity matrix is via singular value decomposition (SVD).

As per Jupp and Vozoff (Stable Iterative Methods for the Inversion of Geophysical Data, Geophysical Journal of the Royal Astronomical Society, 42 (3), pp. 957-976, 1975), stability can be enforced via damping of the singular values. This method is particularly advantageous as it explicitly avoids constructing a stabilizing functional and selecting a regularization parameter. Rather, stability is enforced by damping contributions from irrelevant model parameters (i.e., those with small singular values). The damping conditions can be preset to eliminate a need for user intervention.

Data and model weights can be applied to equation (24) such that the dynamic range of the data and model weights are decreased for improved inversion performance.

An advantage of this inversion method is that it enforces the changes in permittivity to take a range of pre-determined values, corresponding to changes in fluid properties. This enables the inversion to be achieved using deterministic methods. The model parameters that are recovered are the indices of the fluid type, e.g., cement 28, spacer fluid 26, drilling fluid 24. Hence, this presents a method for directly inverting EM data for fluid type.

It is well known that the Born approximation is valid for weak scattering media, but serves a useful purpose for demonstrating how to linearize the EM responses. In some embodiments, the Born approximation of equations (6) and (12) can be replaced with any of the linearized integral equations methods, such as extended Born, localized nonlinear (LN), quasi-linear (QL), or the quasi-analytical (QA) method. In some other embodiments, the Born approximation of equations (6) and (12) can be replaced with a nonlinear integral equation method.

However, in some embodiments, we can exploit the fact that the linear relation:

$$E_a(r) = \hat{\lambda} E_b(r), \quad (26)$$

where $\hat{\lambda}$ is a scattering tensor, always exists, and we can numerically evaluate the scattering tensor or its scalar approximation through a precomputed library of background conductivity models.

The scattering tensor elements are slowly varying, so we can interpolate the elements of the scattering tensor as a function of anomalous conductivity with a polynomial or spline function. This ensures accuracy for the EM responses and sensitivities.

The same principle can be applied to time-lapse EM data as described more fully below. The flow-through of the modeling and sensitivity calculations with these methods are not included here, but are implied.

Other Considerations

The formation resistivity can be known a priori from drilling (e.g., logging while drilling (LWD) resistivity logs) or open-hole wireline logging (e.g., LATEROLOG™) tools, induction tools, multi-component induction tools, propagation tools, dielectric logs, etc.) of the borehole. The background electric fields and Green's functions for a number of background conductivity models (inclusive of geometry and complexity, formation resistivity, etc.) can be pre-calculated, stored, and interrogated via a look-up table or interpolation function (e.g., splines) using any appropriate numerical solver. Data entries in the look-up table can be interrogated using efficient computational search techniques and algorithms, such as binary or hash search. This enables the method to be applied without needing successive background model computations by a computationally intensive numerical solver.

The method can be generalized to other electrode/antenna configurations and EM data types (i.e., not limited to S-parameters, such as port voltages or currents).

In certain embodiments, workflows encapsulating the disclosed method can be inclusive of prior art modeling, inversion, and/or imaging methods of EM data measured at two or more different times. Such workflows can ensure data quality control (QC), system calibration, and may eliminate cumulative errors since any systematic error in the time-lapse EM measurements can result in increasing absolute errors in the time-lapse EM data.

The dimensionality of the model (e.g., 1D, 2D, 3D) is based on an interpreter's selection and/or requirement for solving particular well monitoring problems.

The disclosed method may be encompassed in software or instructions, which may be programmed on serial and/or parallel processing architectures. The processing and related functions may be performed remotely from the well (e.g., cloud computers), for example, with the computer 32 at the well being connected to remote processing computers via a network (such as, satellite, radio frequency, Internet, etc.). This means that the computer 32 at the well site does not necessarily require high computational performance and, subject to network reliability, all EM modeling, inversion and/or imaging can effectively be done in real time.

The methods disclosed can be incorporated in a method of joint inversion of time-lapse EM data with other fluid data (e.g., radio frequency identification (RFID) tags in the fluids, with determination of RFID tag identity, position and relative movement in the annulus 12), fluid flow, or joint inversion across multiple quadrants of the annulus.

The disclosed method can be applied directly to invert time-lapse EM data for change in fluid conductivity. As disclosed, the method can ensure a rapid inverse solution that doesn't require successive, computationally intensive forward modeling runs with advanced numerical solvers. This greatly simplifies the integration of the method into real-time, proprietary software such as iCem™ marketed by Halliburton Energy Services, Inc. of Houston, Tex. USA.

The disclosed method provides workflows for directly modeling and inverting time-lapse EM data to recover the time lapse changes in electrical properties of fluids in the annulus 12. The disclosed method provides workflows for recovering the time lapse changes in electrical properties of cement 28 in the annulus 12 over time (e.g., to monitor cement cure state or long term integrity).

The method can be performed downhole, enabling the telemetry of a conductivity or fluid model, rather than EM data, to the receiver 30. The method can be performed without successive, computationally intensive forward modeling runs with advanced numerical solvers that capture the geometry and complexity of the well. The method can be packaged as part of integrated well management software and related workflows through an application programmable interface (API).

Time-lapse Dielectric Analysis

In some embodiments, the EM sensors 20 may be permanently deployed on the casing 14 for monitoring of fluids in the annulus 12. In other embodiments, the EM sensors 20 may be deployed on wireline (e.g., with high or multi-frequency dielectric logging tools), coiled tubing or other conveyance in the casing 14.

A difference in dielectric properties due to a change in fluid near an EM sensor 20 results in measurable changes in EM data generated with the sensor. Time-lapse EM data can be directly inverted for the change in dielectric properties of the fluids proximate the EM sensor 20.

Figure 5A:
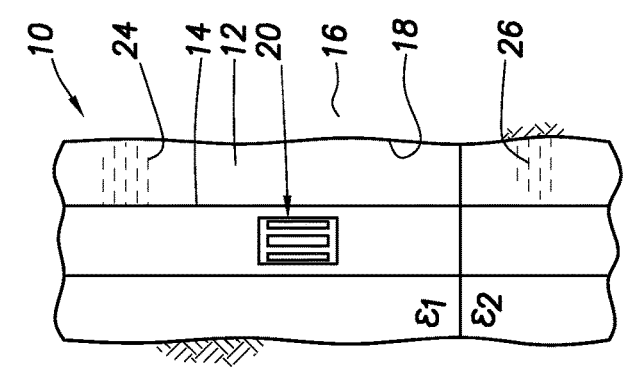
FIGS. 5A-C are representative partially cross-sectional view of an example of the system, with different fluids proximate the electromagnetic sensor.

Referring additionally now to FIGS. 5A-C and FIGS. 6A-C, an example of a time-lapse EM survey using the EM sensor 20 in the system 10 is representatively illustrated. In FIG. 5A, EM data is acquired by the sensor 20 at a first time, with a first fluid type (such as the drilling fluid 24) having a dielectric property $\in_1$ in the annulus 12 proximate the sensor. The EM data is plotted in the graph depicted in FIG. 6A. Note that a local minima is detected at a frequency $f_1$.

Figure 5B:
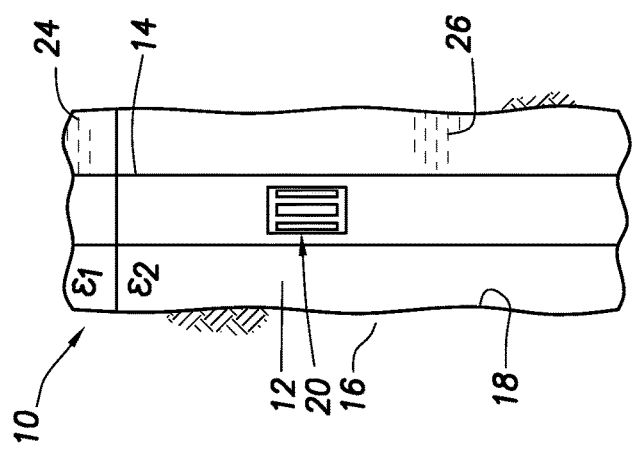

In FIG. 5B, EM data is acquired by the sensor 20 at a second time, with a second fluid type (such as the spacer fluid 26) having a dielectric property $\in_2$ in the annulus 12 proximate the sensor. The EM data is plotted in the graph depicted in FIG. 6B. Note that a local minima is detected at a frequency $f_2$.

Figure 5C:
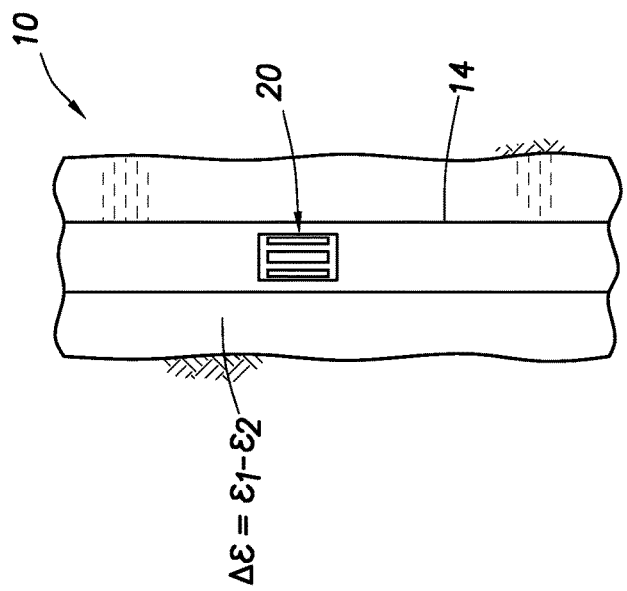
Figure 6A:
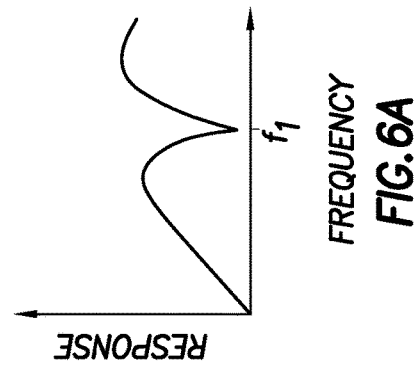
FIGS. 6A-C are representative plots of response versus frequency for the respective FIGS. 5A-C.
Figure 6B:
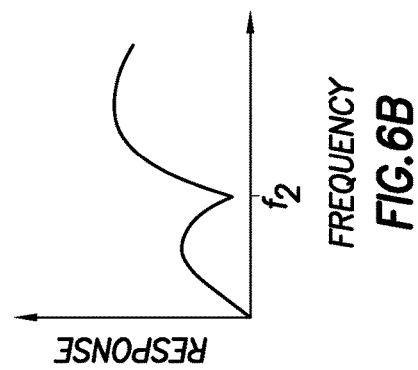
Figure 6C:
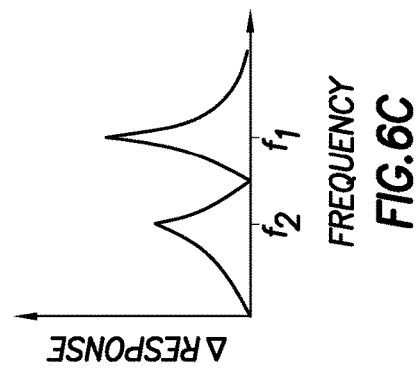

In FIG. 5C, it is representatively illustrated that a change in dielectric properties $\Delta\in$ of the fluids 24, 26 proximate the sensor 20 (from FIG. 5A to FIG. 5B) is due to the fluid displacement in the annulus 12. The change in dielectric properties $\Delta\in$ is plotted in the graph depicted in FIG. 6C.

Figure 7:
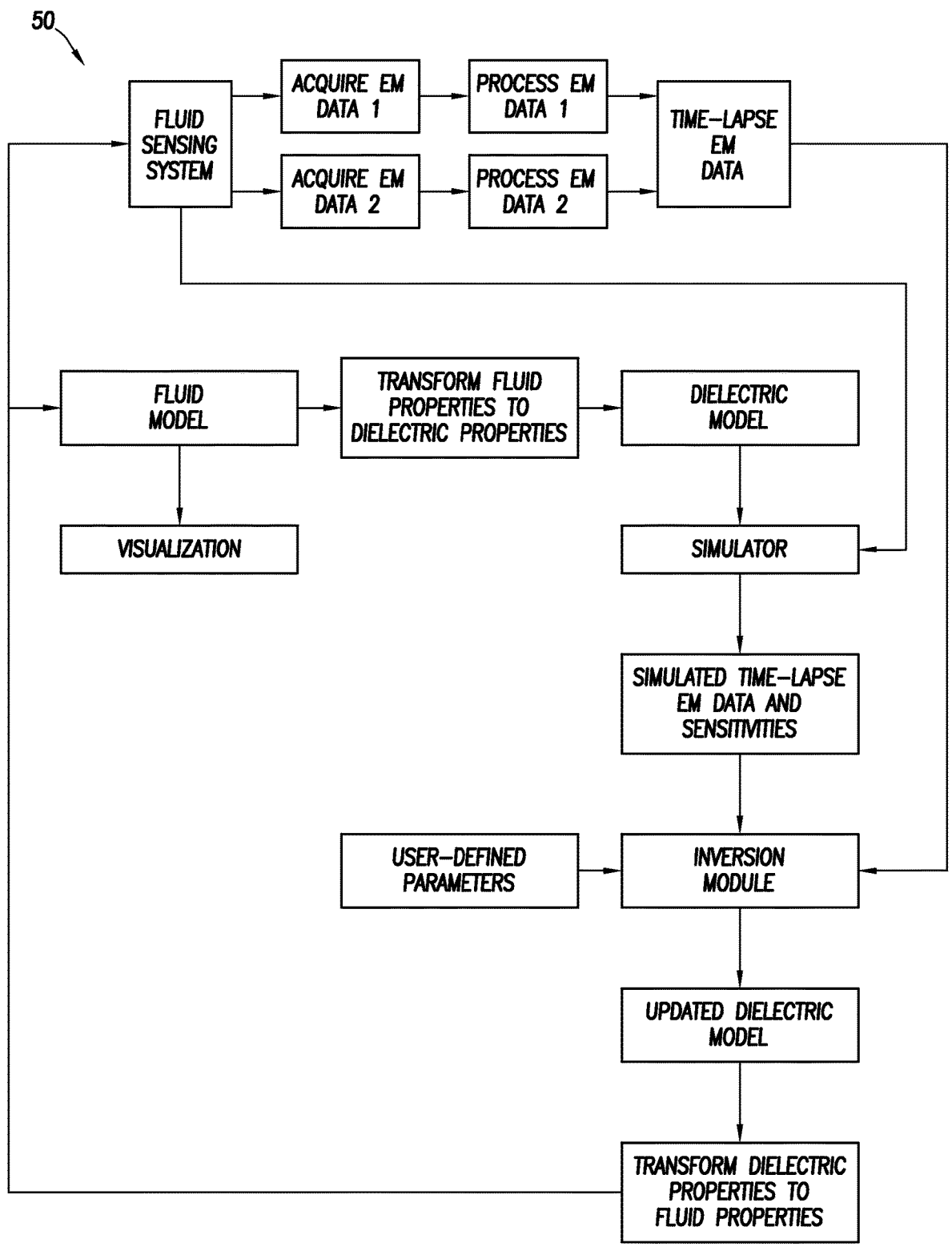
FIG. 7 is a representative workflow for an example of the method.

Referring additionally now to FIG. 7, an example of a flowchart for a method 50 of time-lapse dielectric inversion. The method 50 can be used for monitoring fluids in the annulus 12 of the system 10, for example, during a cementing operation. However, the method 50 may be used with other systems, in keeping with the principles of this disclosure.

In the method 50, a difference in dielectric properties due to a change in fluids near or in a formation results in measurable changes in EM signals measured over time by an EM sensor. The method is not limited to any particular EM sensor. For example, the sensor 20 of FIGS. 2-4C may be used, or the high frequency dielectric tool mentioned above, or a microwave formation evaluation tool marketed by Halliburton Energy Services, Inc. of Houston, Tex. USA may be used.

The method 50 models and inverts time-lapse EM data from any EM sensor(s) to determine changes in dielectric properties of a fluid proximate the EM sensor. Changes in the fluid type may be identified by subsequent analysis of the change in dielectric properties.

EM Modeling

The distribution of the dielectric properties in the annulus 12 of a well formed between casing 14 and the formation 16 can be assumed to be piecewise continuous. For example, a three-dimensional (3D) model in cylindrical coordinates can be constructed as the juxtaposition of volume elements populated by discrete values of the electrical properties and the EM fields and/or sensitivities modeled using a 3D numerical simulator.

For the purpose of 3D EM modeling of EM sensors proximate the annulus 12, the 3D dielectric model can be separated into background (b) and anomalous (a) parts:

$$\hat{\in}(r)=\hat{\in}_b(r)+\hat{\in}_a(r), \tag{27}$$

which can be complex, frequency-dependent and described by a second rank tensor:

$$\hat{\in} = \begin{bmatrix} \in_{xx} & \in_{xy} & \in_{xz} \\ \in_{yx} & \in_{yy} & \in_{yz} \\ \in_{zx} & \in_{zy} & \in_{zz} \end{bmatrix}, \tag{28}$$

which, due to energy considerations, is symmetric. Generally, the dielectric properties of a fluid are isotropic and frequency-dependent, and the dielectric properties of the formation may be anisotropic and frequency-dependent.

It follows that Maxwell's equations can separate the electric and magnetic fields into background (b) and anomalous (a) parts:

$$E(r)=E_b(r)+E_a(r), \tag{29}$$

$$H(r)=H_b(r)+H_a(r), \tag{30}$$

where the background fields are computed for the extraneous sources in the background dielectric model, and the anomalous fields are computed for scattering currents in the anomalous dielectric model. The background conductivity model can be chosen such that the background fields may be evaluated analytically or semi-analytically to avoid subsequent numerical instabilities in the solution of the anomalous fields.

Maxwell's equations may be solved in either of their differential or integral forms. For example, in the frequency-domain, the EM fields can be written as the Fredholm integral equations of the second kind:

$$E(r')=E_b(r')+i\omega\int_V \hat{G}_E(r',r)\in_a(r)[E_b(r)+E_a(r)]d^3r, \tag{31}$$

$$H(r')=H_b(r')+i\omega\int_V \hat{G}_H(r',r)\in_a(r)[E_b(r)+E_a(r)]d^3r, \tag{32}$$

where $\hat{G}_{E,H}$ is the electric or magnetic Green's tensor for the background dielectric model. The background conductivity model is chosen such that the Green's tensors may be evaluated analytically or semi-analytically to avoid subsequent numerical instabilities in the solution of the anomalous fields. However, in some embodiments, the Green's tensors may be evaluated numerically for arbitrarily-complex background dielectric models.

Equations (31) and (32) are nonlinear, initially requiring the solution of equation (31) within the 3D dielectric model. EM transfer functions for the EM sensors, such as phase, attenuation, impedance and/or S-responses can be derived from the electric and/or magnetic fields solved via equations (31) and/or (32).

Time-lapse EM Modeling

For EM data acquired by an EM sensor deployed on casing, transmitter and receiver locations are constant. During a cementing operation, the EM sensor is operated to generate EM data as the fluids 24, 26, 28 in the annulus 12 are displaced (e.g., during pumping) and/or emplaced (e.g., cement curing). The EM data may be sampled and recorded at discrete time intervals. The difference in EM data between any two discrete time intervals, denoted by superscripts 1 and 2, is denoted time-lapse EM data. We can write forms of equation (34) as:

$$E^1(r')=E_b(r')+i\omega\int_V \hat{G}_E(r',r)\in_a^1(r)[E_b(r)+E_a^1(r)]d^3r, \qquad (33)$$

and $$E^2(r')=E_b(r')+i\omega\int_V \hat{G}_E(r',r)\in_a^2(r)[E_b(r)+E_a^2(r)]d^3r, \qquad (34)$$

Note that the background fields are constant between the two surveys.

The time-lapse EM response is defined as the difference between equations (33) and (34):

$$E^1(r')-E^2(r')=i\omega\int_V \hat{G}_E(r',r)\{\in_a^1(r)[E_b(r)+E_a^a(r)]-\in_a^2(r)[E_b(r)+E_a^2(r)]\}d^3r. \qquad (35)$$

A difficulty with equation (35) is that it is nonlinear with respect to both the anomalous dielectric and the electric fields inside the 3D dielectric model at both time periods. Given this nonlinearity, it might be presumed that the time lapse EM inverse problem must be solved as two separate 3D EM inversion problems corresponding to the two independent EM measurements.

However, we assume that there exists a relation between the anomalous electric fields at the two time periods:

$$E_a^2(r')=\hat{\lambda}E_a^1(r'), \qquad (36)$$

where $\hat{\lambda}(r')$ is called a perturbation tensor, which is a second rank tensor that can be proven to always exist:

$$\hat{\lambda} = \begin{bmatrix} \lambda_{xx} & \lambda_{xy} & \lambda_{xz} \\ \lambda_{yx} & \lambda_{yy} & \lambda_{yz} \\ \lambda_{zx} & \lambda_{zy} & \lambda_{zz} \end{bmatrix}. \qquad (37)$$

Equation (37) is general, in that we don't have to enforce specific values, relations or functions upon the perturbation tensor, whose elements may be determined from a deterministic function, from a linear minimization problem, or from a nonlinear minimization problem.

In some embodiments, the perturbation tensor can be reduced to be diagonally dominant:

$$\hat{\lambda} = \begin{bmatrix} \lambda_{xx} & 0 & 0 \\ 0 & \lambda_{yy} & 0 \\ 0 & 0 & \lambda_{zz} \end{bmatrix}. \qquad (38)$$

In some embodiments, the perturbation can be reduced to be a scalar:

$$\hat{\lambda} = \lambda \begin{bmatrix} 1 & 0 & 0 \\ 0 & 1 & 0 \\ 0 & 0 & 1 \end{bmatrix} = \lambda I, \qquad (39)$$

where I is the identity tensor.

The complexity of the perturbation tensor is related to the overall complexity (i.e., non-linearity) of the time-lapse dielectric problem.

Without loss of generality, it follows that equation (37) reduces equation (36) to the integral equation:

$$[I-\hat{\lambda}(r')]E_a^1(r')=i\omega\int_V \hat{G}_E(r',r)\{\in_a^1(r)-\in_a^2(r)\}\{E_b(r)+[I-\lambda(r)]E_a^1(r)\}d^3r. \qquad (40)$$

If we denote:

$$P(r')=[I-\lambda(r)]E_a^1(r), \qquad (41)$$

$$\Delta\in_a(r)=\in_a^1(r)-\in_a^2(r), \qquad (42)$$

as the perturbed electric fields and change in dielectric, respectively, we can re-write equation (40) as:

$$P(r')=i\omega\int_V \hat{G}_E(r',r)\Delta\in_a(r)\{E_b(r)+P(r)\}d^3r, \qquad (43)$$

which we recognize is a Fredholm integral equation of the second kind. Note that the integral in equation (43) will only have contributions from those volumes of the 3D model where $\Delta\in_a(r)\neq 0$. That means time-lapse EM data will only be generated when there is a change in fluid composition.

Example of Linearization of the Perturbation Tensor

Assume the perturbation tensor can be reduced to a scalar per equation (39) and with equation (42), we re-write equation (40) as:

$$[1-\lambda(r')]E_a^1(r')=i\omega\int_V \hat{G}_E(r',r)\Delta\in_a(r)\{E_b(r)+[1-\lambda(r)]E_a^1(r)\}d^3r, \qquad (44)$$

which we can expand as:

$$[1-\lambda(r')]E_a^1(r')=i\omega\int_V \hat{G}_E(r',r)\Delta\omega_a(r)E_b(r)d^3r+i\omega\int_V \hat{G}_E(r',r)\Delta\in_a(r)[1-\lambda(r)]E_a(r)d^3r. \qquad (45)$$

As per conventional EM modeling (e.g., Habashy et al., Beyond the Born and Rytov Approximations: A Nonlinear Approach to Electromagnetic Scattering, Journal of Geophysical Research, 98 (B2), pp. 1759-1775, 1993), the Green's tensor $\hat{G}_E(r',r)$ exhibits a singularity when $r'=r$ which must be avoided when computing the volume integrals in equation (45). The result is that the dominant contributions to the integrals on the right hand side of equation (45) are from the observation points r that are proximal to point r'.

If we assume that $\lambda(r)$ is a slowly varying function in the volume V such that $\lambda(r')=\lambda(r)$, then:

$$[1-\lambda(r')]E_a^1(r')\approx i\omega\int_V \hat{G}_E(r',r)\Delta\in_a(r)E_b(r)d^3r+i\omega[1-\lambda(r')]\int_V \hat{G}_E(r',r)\Delta\in_a(r)E_a(r)d^3r. \qquad (46)$$

We write:

$$E_B(r')=i\omega\int_V \hat{G}_E(r',r)\Delta\in_a(r)E_b(r)d^3r, \qquad (47)$$

$$E_A(r')=i\omega\int_V \hat{G}_E(r',r)\Delta\in_a(r)E_a(r)d^3r, \qquad (48)$$

and note that $E_B(r')\neq 0$ and $E_A(r')\neq 0$ provided that $\Delta\in_a(r)\neq 0$ for all r. We can now re-write equation (46) as:

$$[1-\lambda(r')]E_a^1(r')=E_B(r')+[1-\lambda(r')]E_A(r'), \qquad (49)$$

and re-arrange to obtain:

$$[1-\lambda(r')][E_a^1(r')-E_A(r')]=E_B(r'). \qquad (50)$$

Since we are considering a scalar perturbation tensor, we can reduce equation (50) to a scalar function by calculating a dot product of both sides of equation (50). Assuming that $E_B(r')\neq 0$, then we can do this as:

$$1-\lambda(r') = \frac{E_B(r')\cdot E_B^*(r')}{[E_a^1(r')-E_A(r')]\cdot E_B^*(r')}, \qquad (51)$$

where * denotes the complex conjugate. Re-arranging equation (51) results in an expression for the scalar perturbation tensor:

$$\lambda(r') = \\ 1 - \frac{E_B(r\prime) \cdot E_B^*(r\prime)}{[E_a^1(r') - E_A(r')] \cdot E_B^*(r')} = \frac{[E_a^1(r') - E_A(r') - E_B(r')] \cdot E_B^*(r')}{[E_a^1(r') - E_A(r')] \cdot E_B^*(r')}, \quad (52)$$

assuming that $[E_a^1(r')-E_A(r')]\cdot E^*_B(r')\neq 0$, and where $E_a^{-1}(r')$, $E_B(r')$, and $E_A(r')$ all have known (or calculated) values. An advantage of equation (52) is that the scalar perturbation tensor can be evaluated quasi-analytically.

For inversion, we calculate the Fréchet derivatives (or sensitivities) of equation (40) with respect to the time lapse change in conductivity, $\Delta\in_a(r)$.

The following presents one example of a linearization of equation (40) to solve for a scalar perturbation tensor (39). With equation (42), we re-write equation (40) as:

$$\frac{\partial P(r\prime)}{\partial[\Delta\epsilon_a(r)]} = \\ \frac{\partial}{\partial[\Delta\epsilon_a(r)]} i\omega \int_V \hat{G}_E(r', r)\Delta\epsilon_a(r)\{E_b(r) + [1 - \lambda(r)]E_a^1(r)\}d^3r. \quad (53)$$

We note that:

$$\frac{\partial \hat{G}_E(r',r)}{\partial[\Delta\epsilon_a(r)]} = \frac{\partial E_b(r)}{\partial[\Delta\epsilon_a(r)]} = \frac{\partial E_a^1(r)}{\partial[\Delta\epsilon_a(r)]} = 0, \quad (54)$$

which implies equation (24) reduces to:

$$\frac{\partial P(r\prime)}{\partial[\Delta\epsilon_a(r)]} = i\omega \int_V \hat{G}_E(r', r)\{E_b(r) + [1 - \lambda(r)]E_a^1(r)\}d^3r - \\ i\omega \int_V \hat{G}_E(r', r)\Delta\sigma_a(r)\frac{\partial\lambda(r)}{\partial[\Delta\epsilon_a(r)]}E_a^1(r)d^3r. \quad (55)$$

We can then write:

$$F_{QB}^1(r')=i\omega\int_V \hat{G}_E(r',r)\{E_b(r)+E_a^{-1}(r)\}d^3r, \quad (56)$$

as the Quasi-Born sensitivities, and simplify equation (53) as:

$$\frac{\partial P(r\prime)}{\partial[\Delta\epsilon_a(r)]} = \\ F_{QB}^1(r') - i\omega \int_V \hat{G}_E(r', r)\left\{\lambda(r) + \Delta\epsilon_a(r)\frac{\partial\lambda(r)}{\partial[\Delta\epsilon_a(r)]}\right\}E_a^1(r)d^3r. \quad (57)$$

An advantage of equation (57) is that the Fréchet derivatives (or sensitivities) can be evaluated with minimal computational effort since all variables in equation (57) are known from modeling (44), or can be evaluated from known variables, e.g., $$\frac{\partial\lambda(r)}{\partial[\Delta\epsilon_a(r)]}$$

can be evaluated from the chain rule differentiation of equation (52).

Further, analytical expressions for rock physics models that relate permittivity to rock and fluid properties can be derived (e.g., complex refractive index method (CRIM), effective medium theory, etc).

Other Considerations

In some embodiments, workflows encompassing the disclosed method 50 can be inclusive of prior modeling, inversion and/or imaging methods of EM data measured at two or more different times. Such workflows can ensure data quality control (QC), system calibration, and may eliminate cumulative errors since any systematic error in the time-lapse EM measurements can result in increasing absolute errors in the time-lapse EM data.

The dimensionality of the model and related EM simulator (e.g., 1D, 2D, 3D) can be based on an interpreter's selection and/or requirement for solving particular monitoring problems.

The EM simulator can be based on any combination of analytical and/or semi-analytical and/or finite-difference and/or finite-volume and/or finite-element and/or boundary-element and/or integral equation methods implemented in Cartesian and/or cylindrical and/or polar coordinates.

The method 50 can be incorporated in a method of joint inversion of time-lapse EM data with other resistivity (e.g., resistivity microlog) or fluid data (e.g., RFID's), or with fluid flow simulations.

With a finite number and/or slowly varying properties of formations and fluids, as well as EM system configuration and frequencies of operation, many of the variables in the method 50 can be pre-calculated, stored, and/or interrogated from a look-up table.

The method 50 can be applied for temporal (e.g., wireline) systems, or permanent systems. When data are not acquired from the same position (e.g., wireline logs), interpolation (e.g., spline, polynomial, etc.) may be applied to re-datum the data for subsequent time-lapse analysis.

The method 50 directly models and inverts time-lapse EM data for changes in the dielectric properties of formations and fluids. Time lapse changes in fluid properties (e.g., cement cure state, change in salinity, etc) can also be determined.

The method 50 can provide identification/classification of the fluid types/species present proximate the EM sensor 20. The method 50 can be packaged as part of an integrated well planning and management software and related workflows through an application programmable interface (API).

The method 50 can utilize high frequency EM impulses, where the dielectric contributions dominate the EM responses.

Recovering RFID Tag Location in the Annulus

In another example, measuring and monitoring of fluids in the annulus 12 can be performed by modeling and inversion of RFID tag data acquired by RFID sensors. Such a method may be performed to monitor fluids in the annulus 12 during a cementing operation, long-term (e.g., for a life of the well, such as, to monitor cement health, etc.) or for other purposes.

In one example, in order to diagnose and assess a quality of the cementing operation during placement, a plurality of RFID sensors can be deployed along the casing 14. RFID tags (radio frequency identification tags) are added to the fluids 22 (such as, drilling fluid 24, spacer 26, cement 28, etc.) pumped through the casing 14 and into the annulus 12. Different RFID tags are mixed with corresponding different fluid types.

The RFID sensors can comprise electromagnetic transmitters and receivers placed, for example, on the centralizers 44 and/or casing 14. The presence of the RFID tags results in measurable changes in electromagnetic fields measured by the RFID sensors.

The RFID sensors can in some examples transmit, receive, process and telemeter RFID data to the telemetry unit 30. Conventional RFID systems operate from several MHz to GHz. This disclosure provides a method whereby such RFID data can be interrogated for RFID tag positions, and by proxy, fluid type positions.

Figure 8:
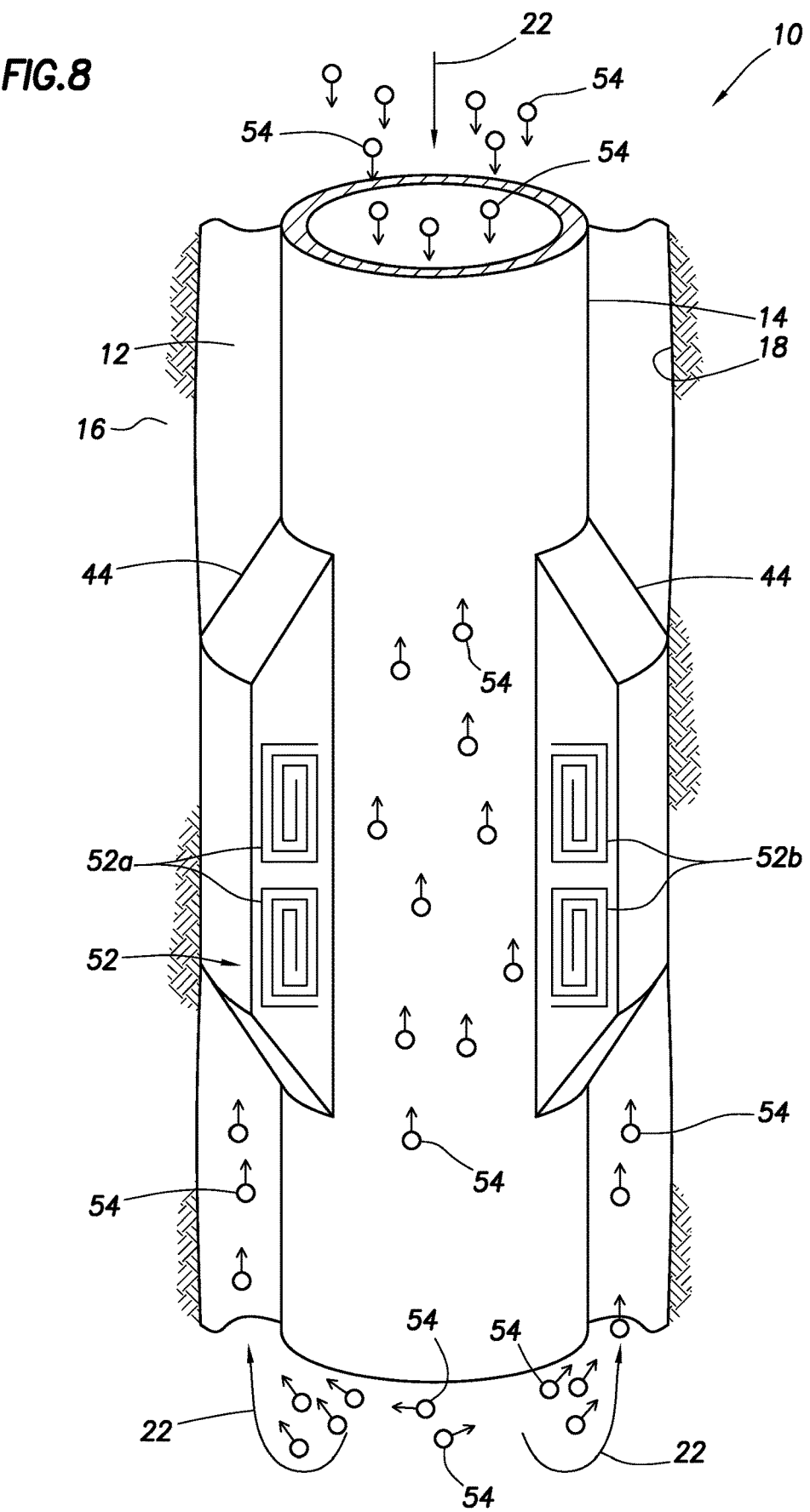
FIG. 8 is a representative partially cross-sectional view of another example of the system, in which radio frequency identification sensors are used.

Referring additionally now to FIG. 8, an example of the system 10 with RFID sensors 52 is representatively illustrated. Although only one RFID sensor 52 is visible in FIG. 8, multiple RFID sensors would in this example be distributed longitudinally along the casing 14, similar to the manner in which the EM sensors 20 are distributed along the casing in the FIG. 1 example.

RFID tags 54 are mixed with the fluids 22 flowed through the casing 14 and into the annulus 12. In situations where different fluid types are flowed through the annulus 12, the RFID tags 54 pumped with each fluid type will have a unique identifying characteristic so that, by identifying a specific RFID tag, the fluid type corresponding to that RFID tag is known.

In the FIG. 8 example, the RFID sensors include EM transmitters 52a and EM receivers 52b incorporated into the centralizers 44. In this manner, the RFID tags 54 will displace between the transmitters 52a and the receivers 52b as they flow with the fluids 22 through the annulus 12. However, other positions of the transmitters 52a and receivers 52b may be used in keeping with the principles of this disclosure.

Figure 9A:
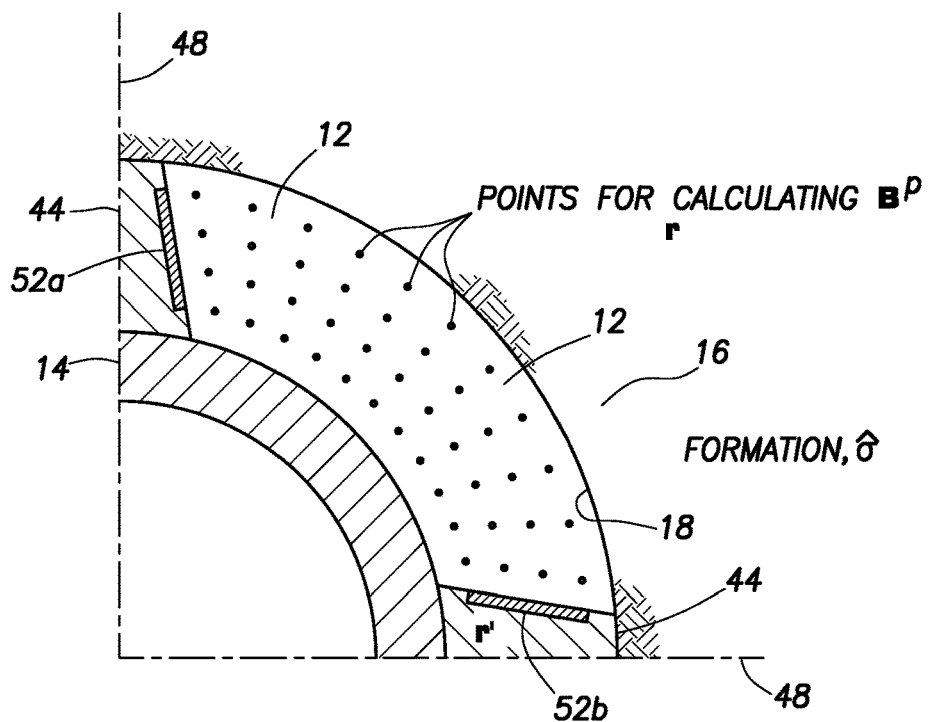
FIGS. 9A-C are representative partially cross-sectional views of an example of the system taken through the quadrant of the annulus, indicating points for calculating magnetic induction and Green's functions in the annulus, and discretization of the annulus.
Figure 9B:
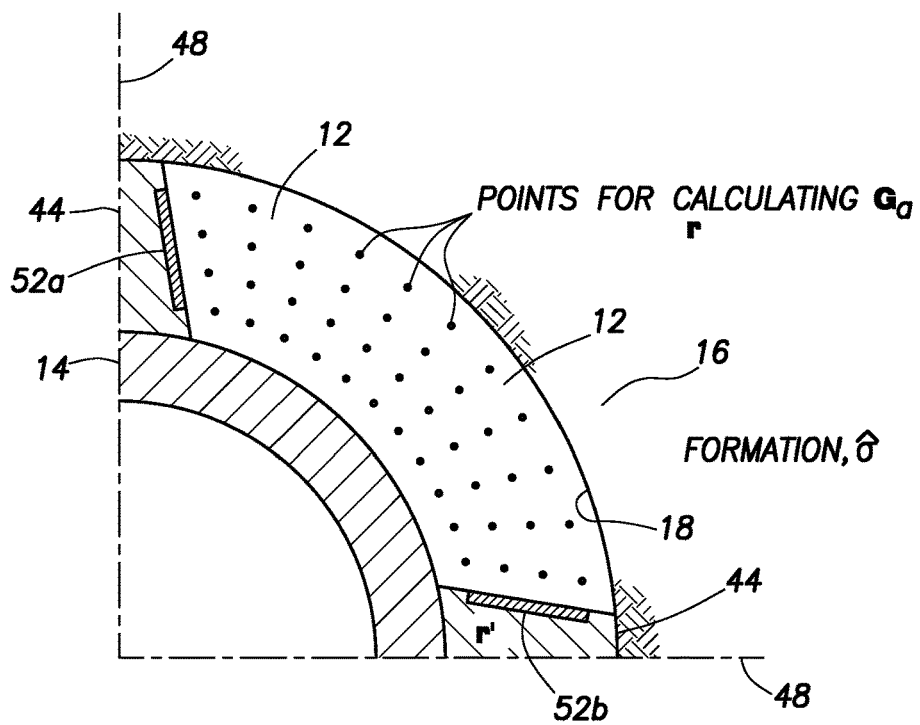
Figure 9C:
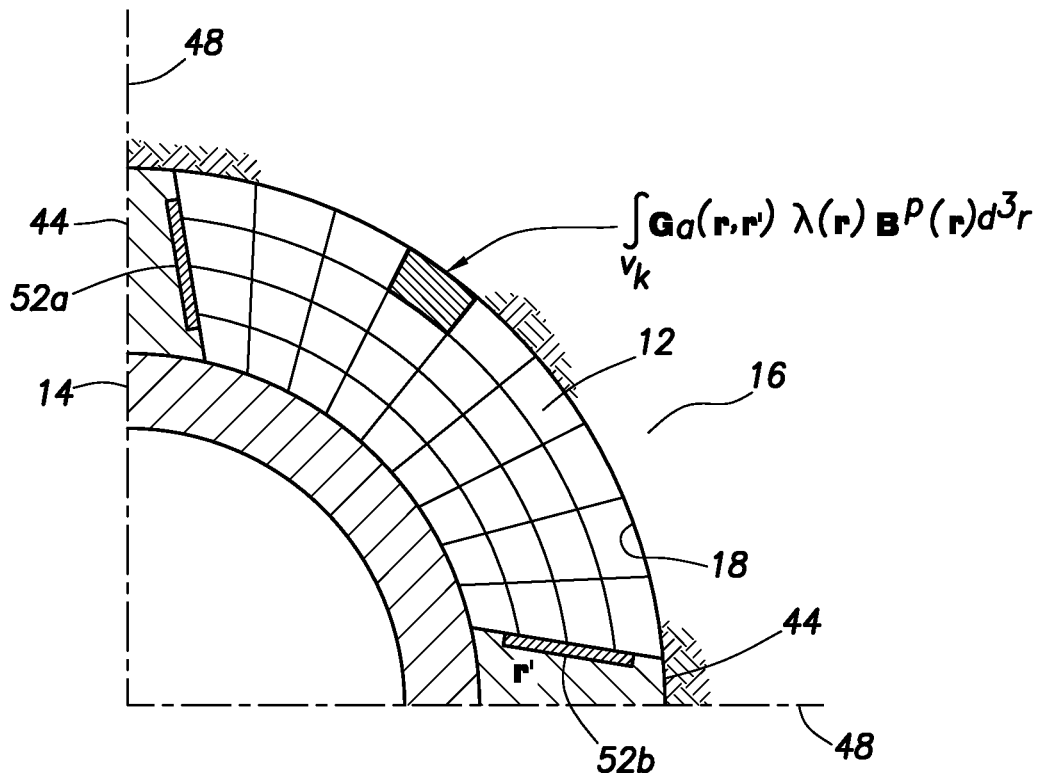

Referring additionally now to FIGS. 9A-C, axes of symmetry 48 are taken advantage of to reduce computational effort, while maintaining complexity and boundary conditions. In this example, the axes of symmetry 48 define a quadrant of the annulus 12 bounded radially by the casing 14 and the formation 16, and bounded circumferentially by the centralizers 44. In other examples, different axes of symmetry may be presented, or such a reduction of computational effort may not be sought.

In FIG. 9A, an impulse source is applied at the transmitter 52a to a background conductivity model. A magnetic field B at the receiver 52b is calculated. Triaxial components of magnetic induction (radial, azimuthal and vertical components in cylindrical coordinates or x, y and z components in Cartesian coordinates) are calculated at discrete points in the quadrant of the annulus 12. This magnetic induction is referred to as the primary magnetic induction $B^p$ (r).

In FIG. 9B, an impulse source is applied at the receiver 52b to the background conductivity model. In this example, the magnetic fields are the body-receiver Green's functions $G_H(r',r)$ for the impulse source at the receiver 52b.

In FIG. 9C, an RFID tag response is computed using the primary magnetic induction $B^p$ (r) and the Green's functions $G_H(r',r)$.

Referring additionally now to FIGS. 10A-E, an example of how detected RFID tag 54 positions in the annulus 12 can be utilized is representatively illustrated. In each of FIGS. 10A-D, possible positions of different RFID tags 54 are determined (e.g., as in FIG. 9C).

Figure 10A:
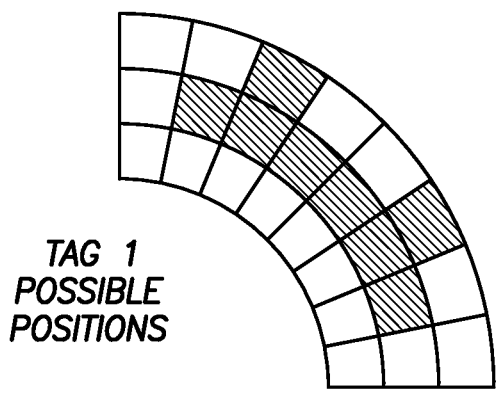
FIGS. 10A-E are representative views of the discretized annulus quadrant, with possible positions of radio frequency identification tags, and cumulative positions of the tags.
Figure 10B:
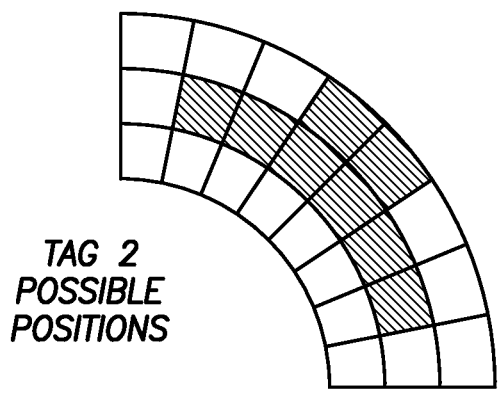
Figure 10C:
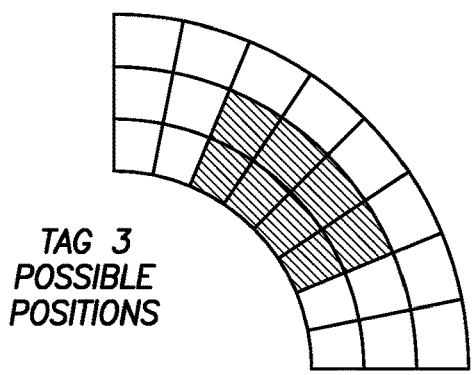
Figure 10D:
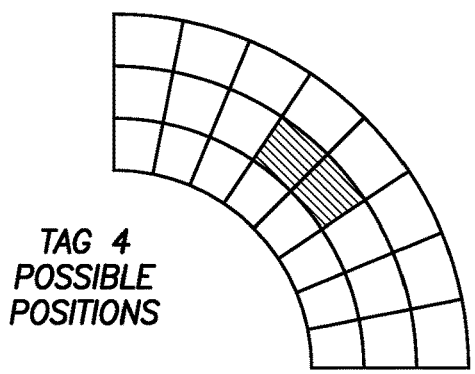

Thus, in FIG. 10A possible positions of a first RFID tag 54 are depicted, in FIG. 10B possible positions of a different second RFID tag are depicted, in FIG. 10C possible positions of a different third RFID tag are depicted, and in FIG. 10D possible positions of a different fourth RFID tag are depicted. Detection of the different RFID tags 54 would occur at respective different times, corresponding to presence of respective different fluid types in the annulus 12 at the RFID sensor 52.

Figure 10E:
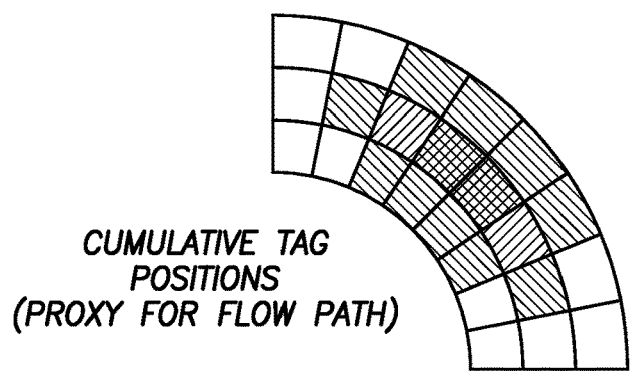

In FIG. 10E, the possible positions of the various different RFID tags 54 are superimposed to construct an image of the cumulative tag positions. This indicates a flow path for the fluids 22 in the annulus 12.

During a cementing operation, RFID tags 54 can be added to fluids 22. Tags 54 with different RFID characteristics (e.g., resonant frequency) may be assigned to different ones of the fluids 22. This enables fluid discrimination based on RFID tag 54 detection.

In one example, the RFID tags 54 can each comprise a passive RFID circuit (e.g., a planar induction loop) spherically encapsulated in an abrasive, chemical, and pressure resistant material. During the cementing operation, the tags 54 can flow with the fluids 22 at a speed of approximately 1 m/s through the annulus 12.

The RFID sensors 52 positioned along the casing 14 can comprise magnetic induction transmitters 52a and receivers 52b positioned on the centralizers 44 and/or on the casing 14. The magnetic induction transmitters 52a may be planar induction coils. The transmitters 52a can operate at one or more frequencies (e.g., at or near the resonant frequencies of the RFID tags 54).

Presence of an RFID tag 54 results in measurable changes in the magnetic induction measured by the RFID sensor 52. This presence is recorded as a count (e.g., a signal above threshold) and amplitude of that count.

In some examples, each sensor 52 may comprise a single transmitter 52a and receiver 52b, and in other examples multiple transmitters and receivers may be used. In some examples, the RFID tags 54 may comprise active circuits. Thus, the scope of this disclosure is not limited to any particular details of the RFID sensor 52 or system 10 described herein or illustrated in the drawings.

The RFID sensor 52 in some examples can transmit, receive, process, and telemeter signals including RFID data (information indicative of an RFID tag 54 characteristic detected by the sensor) to the telemetry unit 30 (see FIG. 1). The RFID data can be inverted to determine the position of the RFID tag 54 in the annulus 12. This can provide insight on fluid flow paths during cementing or other operations.

Modeling

Distribution of electrical and magnetic properties in the annulus 12 can be assumed to be piecewise continuous. For example, a three-dimensional (3D) model in cylindrical coordinates can be constructed as the juxtaposition of volume elements (e.g., tetrahedrals or hexahedrals) populated by discrete values of the electrical and magnetic properties and the EM fields and/or sensitivities modeled using a 3D numerical simulator.

RFID systems may operate from several MHz to GHz. In what follows, a frequency-domain formulation is assumed. While the formulation is developed for a single frequency, application to multiple frequencies is a logical extension of partitioned vectors and matrices.

Reiterating the discussion above for completeness (see equations (1) and (2) above), the electrical properties of the fluids can be expressed as a complex conductivity, $\hat{\sigma}$:

$$\hat{\sigma}(r) = \sigma'(r) + i\sigma''(r), \quad (58)$$

where $\sigma'$ is the real part of the conductivity related to dispersion or loss, and $\sigma''$ is the imaginary part of the permittivity related to the stored energy in the medium.

Excluding induced polarization terms, the imaginary part of the conductivity has the form:

$$\sigma''(r)=\omega \in (r), \quad (59)$$

where ω is the angular frequency, and ∈ is the permittivity.

The fluids 22 are nonmagnetic, such that their permeability is that of free space, μ. However, the model may contain magnetic materials (e.g., steel casing).

The passive RFID tag 54 can comprise a planar induction coil (not shown) with induction L, and can be simulated as a magnetic dipole with a corresponding magnetic moment per unit volume vector $m_t$. A relationship between this moment per unit volume vector and the impedance of the RFID tag 54 can be characterized through theoretical or experimental analysis. The magnetic moment may be orthogonal to a plane of the induction coil. For example, in RFID tag coordinates, the magnetic moment vector may be defined as:

$$m_t = \begin{bmatrix} 0 \\ 0 \\ m \end{bmatrix}, \quad (60)$$

where m is the magnetic moment per unit volume of the tag orthogonal to the plane of the induction coil. This representation is valid whether the RFID tag 54 is passive or active.

Since the RFID tag 54 may be encapsulated in a sphere, the orientation of the RFID tag's magnetic moment is unknown, or at least uncertain. In some embodiments, the RFID tag 54 may be packaged in, for example, an ellipsoid, such that there is alignment with flow.

Regardless, uncertainty in the RFID tag 54 orientation manifests as an Euler rotation matrix R applied to the magnetic moment per unit volume vector:

$$M_t = R m_t, \quad (61)$$

where $M_t$ is the magnetic moment per unit volume of the RFID tag in the RFID sensor's 52 coordinates. The Euler rotation matrix may contain rotations about all three principal axes and is not defined further.

We can write the Maxwell equations:

$$\nabla \times E(r) = -i\omega \mu H(r) - i\omega \mu M_s(r) - \omega \mu M_t(r), \quad (62)$$

$$\nabla \times H(r) = \hat{\sigma}(r) E(r) - i\omega \mu M_s(r) - i\omega \mu M_t(r), \quad (63)$$

where $M_S$ is the magnetic moment per unit volume for the RFID sensor's transmitter 52a. Following the usual derivation of a volume integral equation for vector fields with radiating boundary conditions (e.g., from Morse and Feshbach, Methods of Theoretical Physics, Part II, McGraw-Hill Company, New York, 1953), we obtain the equation:

$$H(r) = i\omega \mu \int_V \hat{G}_H(r',r) \cdot M_s(r) d^3r + i\omega \mu \int_V \hat{G}_H(r',r) \cdot M_t(r) d^3r, \quad (64)$$

where the first integrand is simply the primary magnetic field $H^p$ measured at the RFID receiver 52b generated by the RFID transmitter 52a, and the second integrand is the contribution of the RFID tags 54. We can simplify equation (64) as:

$$H(r') = H^p(r') + i\omega \mu \int_V \hat{G}_H(r',r) \cdot M_t(r) d^3r, \quad (65)$$

and we are often only interested in the RFID tag 54 response:

$$H^t(r') = i\omega \mu \int_V \hat{G}_H(r',r) \cdot M_t(r) d^3r, \quad (66)$$

or some transfer function thereof that relates the primary and RFID tag magnetic fields. In equations (64) to (66), $\hat{G}_H(r',r)$ is the magnetic Green's tensor for the conductivity model $\hat{\sigma}(r)$.

For passive RFID tags 54, we can assume that the magnetic moment per unit volume of the RFID tag is linearly proportional to the primary magnetic inductance:

$$M_t(r) = \hat{\lambda}(r) B^p(r), \quad (67)$$

where $\hat{\lambda}(r)$ is called a magnetization tensor, which is a second rank tensor that can be proven to always exist:

$$\hat{\lambda} = \begin{bmatrix} \lambda_{xx} & \lambda_{xy} & \lambda_{xz} \\ \lambda_{yx} & \lambda_{yy} & \lambda_{yz} \\ \lambda_{zx} & \lambda_{zy} & \lambda_{zz} \end{bmatrix}. \quad (68)$$

Equation (67) realizes that the moment of the RFID tag 54 as a source is proportional to the magnetic induction of the RFID tag. Equation (67) is general, in that we don't have to enforce specific values, relations or functions upon the magnetization tensor, whose elements may be determined from a deterministic function, from a linear minimization problem, or from a nonlinear minimization problem.

In some embodiments, the magnetization tensor can be reduced to be diagonally dominant:

$$\hat{\lambda} = \begin{bmatrix} \lambda_{xx} & 0 & 0 \\ 0 & \lambda_{yy} & 0 \\ 0 & 0 & \lambda_{zz} \end{bmatrix}. \quad (69)$$

In some embodiments, the magnetization tensor can be reduced to be a scalar:

$$\hat{\lambda} = \lambda \begin{bmatrix} 1 & 0 & 0 \\ 0 & 1 & 0 \\ 0 & 0 & 1 \end{bmatrix} = \lambda I, \quad (70)$$

where I is the identity tensor. For example, if the RFID tag 54 has an omnidirectional radiation pattern, equation (70) is valid.

We can now write a form of equation (66):

$$H^t(r') = i\omega \mu \int_V \hat{G}_H(r',r) \cdot \hat{\lambda}(r) B^p(r) d^3r, \quad (71)$$

The background conductivity model can be chosen such that the Green's tensors and primary magnetic induction may be evaluated analytically or semi-analytically to avoid excessive discretization of the sources and related numerical instabilities. However, for all of the geometric and component complexity of the model (including presence of magnetic materials, such as steel casing), such ideal solutions are not possible. Rather, we revert to total field solutions with computational full-wave EM solvers, e.g., finite-element (FE) or finite-difference (FD) or integral equation methods, or their hybrids. One of the advantages of such methods is that they can be formulated with an adaptive mesh algorithm that minimizes error. Such solvers have been realized in a variety of academic and commercial software (e.g., FEKO™ marketed by Altair, Development S.A. (Pty) Ltd of Stellenbosch, South Africa, MICROWAVE STUDIO™ marketed by CST of Framingham, Mass. USA, and HFSS™ marketed by ANSYS, Inc. of Canonsburg, Pa. USA, etc.).

In the present example, we solve for a model that captures all geometric and component complexity of the RFID sensor 52, formation 16 conductivity, and a uniform fluid in the annulus 12. Symmetry and related boundary conditions may be exploited, such that the simulation domain is reduced to a quadrant without loss of accuracy (e.g., as in FIGS. 9A-C). This model is referred to as the background conductivity model.

As per FIG. 9A, an impulse source is applied at the RFID sensor's transmitter 52a. The primary magnetic field at the RFID sensor's receiver 52b is calculated. Note that this is a scalar quantity as there is a single receiver component, $H^p(r')$. The triaxial components of the magnetic induction (radial, azimuthal and vertical components in cylindrical coordinates or x, y and z components in Cartesian coordinates) are calculated at discrete points in the quadrant of the annulus 12. These magnetic inductions are referred to as the primary magnetic inductions, $B^p(r)$.

As per FIG. 9B, an impulse source is applied at the RFID sensor's receiver 52b. The triaxial components of the magnetic field (radial, azimuthal and vertical components in cylindrical coordinates or x, y and z components in Cartesian coordinates) are calculated at the same discrete points in the quadrant of the annulus 12. From reciprocity considerations, these magnetic fields are referred to as the body-to-receiver magnetic Green's functions, $G_H(r',r)$. Note that this is a vector quantity (hence, Green's functions) as there is a single receiver component.

For an actual RFID sensor 52, we reduce equation (71) to:

$$H^t(r') = i\omega\mu \int_V G_H(r',r) \cdot \hat{\lambda}(r) B^p(r) d^3r \quad (72)$$

In one embodiment, the Green's functions and primary magnetic induction can be computed on a relatively fine mesh, where the positions of their computation are the points of Gaussian quadrature for numerically evaluating the volume integral in equations (72) or (73). In another embodiment, the Green's functions and primary magnetic induction can be computed on a relatively coarse mesh, and are interpolated (e.g., by polynomials or splines) to the points of Gaussian quadrature for numerically evaluating the volume integral in equations (72) or (73).

We may approximate the magnetization tensor with a scalar per equation (70) (as per FIG. 9C), such that we obtain:

$$H^t(r') = i\omega\mu \int_V G_H(r',r) \cdot \lambda(r) B^p(r) d^3r \quad (73)$$

The scalar approximation of the magnetization tensor is valid on the basis that there is no certainty on the orientation of the RFID tag 54. The tag 54 may be aligned for maximum coupling with either the RFID sensor's transmitter 52a or receiver 52b, or (most probably) will not be aligned for maximum coupling with either the RFID sensor's transmitter or receiver. This results in inherent non-uniqueness for recovering the RFID tag 54 position. However, upper and low bounds may be imposed on the scalar approximation of the magnetization tensor from a priori knowledge of the RFID tag's properties and the alignment of the RFID sensor's transmitters and receivers.

Model Sampling

Assuming the fluid flow in the annulus 12 is not turbulent (which could be true in certain instances), the orientation of the tag 54 is likely to be constant, at least as it traverses the RFID sensor 52. We can then exploit the fact that the RFID tag 54 is small, implying that the volume integral in equation (73) can be modified as:

$$H^t(r') = i\omega\mu \int_{V_j} G_H(r',r) \cdot \lambda(r) B^p(r) d^3r \quad (74)$$

If a radiation pattern of the RFID tag 54 is (or is close to) omni-directional, then equation (74) will hold even if the flow in the annulus 12 is turbulent.

Equation (74) implies that we can pre-compute $H^t(r')$ (or related transfer functions) for an RFID tag 54 in each element of the model, for a range of magnetization tensor values. These values can be stored in a look-up table or interpolation function (e.g., spline). Observed RFID responses can then be interrogated from the look-up table or interpolation functions. The elements for which the RFID tag 54 could be present can, thus, be extracted.

It is noted that there exists in this model equal probability among the elements for which the RFID tag could be present. Stacking of the elements for which the RFID tag could be present for multiple RFID tag data (i.e., for multiple tag counts and amplitudes) can produce a model with an attribute analogous to the probability of the RFID tag paths (as per FIGS. 10A-E).

Inversion

If approximating the magnetization tensor with a scalar per equation (70), then the sensitivities (or Fréchet derivatives or Jacobians) of the magnetic fields due to the RFID tags is given by the differentiation of equation (73):

$$\frac{\partial H^t(r')}{\partial \lambda(r)} = i\omega\mu \int_V G_H(r',r) \cdot B^p(r) d^3r, \quad (75)$$

which, for a discrete element of the model, has the form:

$$\frac{\partial H^t(r')}{\partial \lambda_j(r)} = i\omega\mu \int_{V_j} G_H(r',r) \cdot B^p(r) d^3r. \quad (76)$$

The sensitivities can be assembled into a M×N sensitivity matrix J, which has the elements:

$$J_{k,j} = \frac{\partial H_k^t(r')}{\partial \lambda_j(r)}. \quad (77)$$

With such modeling that provides the RFID tag responses (73) and sensitivities (76), we can invert the measured RFID responses using any manner of regularized inversion methods (e.g., as per M. S. Zhdanov, Geophysical Inverse Theory and Regularization Problems, Elsevier, Amsterdam, 2002) which may be solved using either stochastic or deterministic optimization methods. However, there is then user-defined choice on the inversion, often requiring substantial user intervention.

We can avoid constructing a stabilizing functional per Tikhonov regularization (e.g., Zhdanov, 2002). Rather, we can truncate the Taylor series for a perturbation about a given vector of model parameters, m:

$$d = A(m) + J\Delta m, \quad (78)$$

where d is the vector of observed data, and A is the (generally) nonlinear forward operator. J is the sensitivity matrix defined previously. We solve for the vector of model parameter updates Δm via the generalized inverse of the sensitivity matrix:

$$\Delta m = J^+[d - A(m)] = J^+ r, \quad (79)$$

where r is the vector of residual errors.

The most stable and efficient manner of evaluating the generalized inverse of the sensitivity matrix is via singular value decomposition (SVD). As per Jupp and Vozoff (Joint Inversion of Geophysical Data, and Stable Iterative Methods for the Inversion of Geophysical Data, Geophysical Journal of the Royal Astronomical Society, 42 (3), pp. 957-991, 1975), stability can be enforced via damping of the singular values.

This method is particularly advantageous as it explicitly avoids constructing a stabilizing functional and selecting a regularization parameter. Rather, stability is enforced by damping contributions from irrelevant model parameters (i.e., those with small singular values). The damping conditions can be preset to eliminate any need for user intervention.

Data and model weights can be applied to equation (79), such that the dynamic range of the data and model weights are decreased for improved inversion performance.

A similar derivation can be developed for electric RFID devices (e.g., with effective electric dipole moment), or for combinations of electric and magnetic RFID devices (e.g., with effective electric and magnetic dipole moments).

The primary magnetic induction and Green's functions for a number of background conductivity models (inclusive of geometry and complexity, formation resistivity, etc.) can be pre-calculated, stored, and interrogated via a look-up table or interpolation function (e.g., splines) using any appropriate numerical solver. Data entries in the look-up table can be interrogated using efficient computational search techniques and algorithms such as binary or hash search. This enables the method to be applied without needing successive background model computations.

The choice of background conductivity model (e.g., fluid properties) may be guided by RFID tag data, or by independent data (e.g., time-lapse dielectric analysis).

The method can be generalized to other RFID sensor configurations and RFID data types. The RFID tag can also operate on the principle of passive modulated backscattering, whereby the sensor 52 transmits or interrogates the RFID tag 54 with an RF carrier frequency, and the passive tag responds with data (e.g., which represent its identity number and communication protocol) modulated on an RF carrier and backscattered to the receiver 52b of the RFID sensor. The tag 54 in this example is powered by a passive rectifier circuit (e.g., a diode/CMOS), which converts RF to DC in order to power a low power application specific integrated circuit (ASIC). The ASIC modulates the circuit that backscatters the interrogated RF signal from the transmitter 52a.

A dimensionality of the model (e.g., 1D, 2D, 3D) is based on the interpreter's selection and/or requirement for solving particular monitoring problems.

The method disclosed above can be encompassed in software, which may be programmed on serial and/or parallel processing architectures. The processing and related functions may be performed remotely from the well (e.g., cloud computers), whereby computers at the well site are connected to remote processing computers via a network. In this manner, computers at the well site don't require high computational performance, and subject to network reliability, all EM modeling, inversion and/or imaging can effectively be done in real time.

The methods disclosed can be incorporated in method of joint inversion of RFID data with other fluid data (e.g., time-lapse dielectric analysis), fluid flow or joint inversion across multiple quadrants of the annulus 12.

The disclosed method can be applied directly to recover the position of RFID tags 54 in the annulus 12. As disclosed, the method can ensure a rapid inverse solution that doesn't require successive, computationally intensive forward modeling runs with advanced numerical solvers. This greatly simplifies the integration of the method into real-time, proprietary software.

This disclosure provides workflows for directly modeling and inverting RFID tag data to recover the position of the RFID tag 54 and fluid type in the annulus 12. The workflows can be performed in real-time.

In some examples, the method can be performed without successive, computationally intensive forward modeling runs with advanced numerical solvers that capture the geometry and complexity of the well.

The workflows can be packaged as part of integrated well management software and related workflows through an application programmable interface (API).

Joint Inversion of Multi-Modal Data for Common Fluid Models

In another example, a method can provide for joint inversion and imaging of both EM and RFID data acquired from EM sensor(s) and RFID sensor(s) deployed on casing 14 for measuring and monitoring fluids in the annulus 12. The RFID sensor detects RFID tags added to the fluids (for example, at the surface) and transported into the well. The EM sensor measures the dielectric properties of the fluids proximate the EM sensor.

Given a commonality of the fluids that can be evaluated by EM and RFID sensors, there is an opportunity to jointly invert their respective data to improve confidence in the resultant models. This disclosure describes such a process of jointly inverting these two data for a common fluid model.

Figure 11:
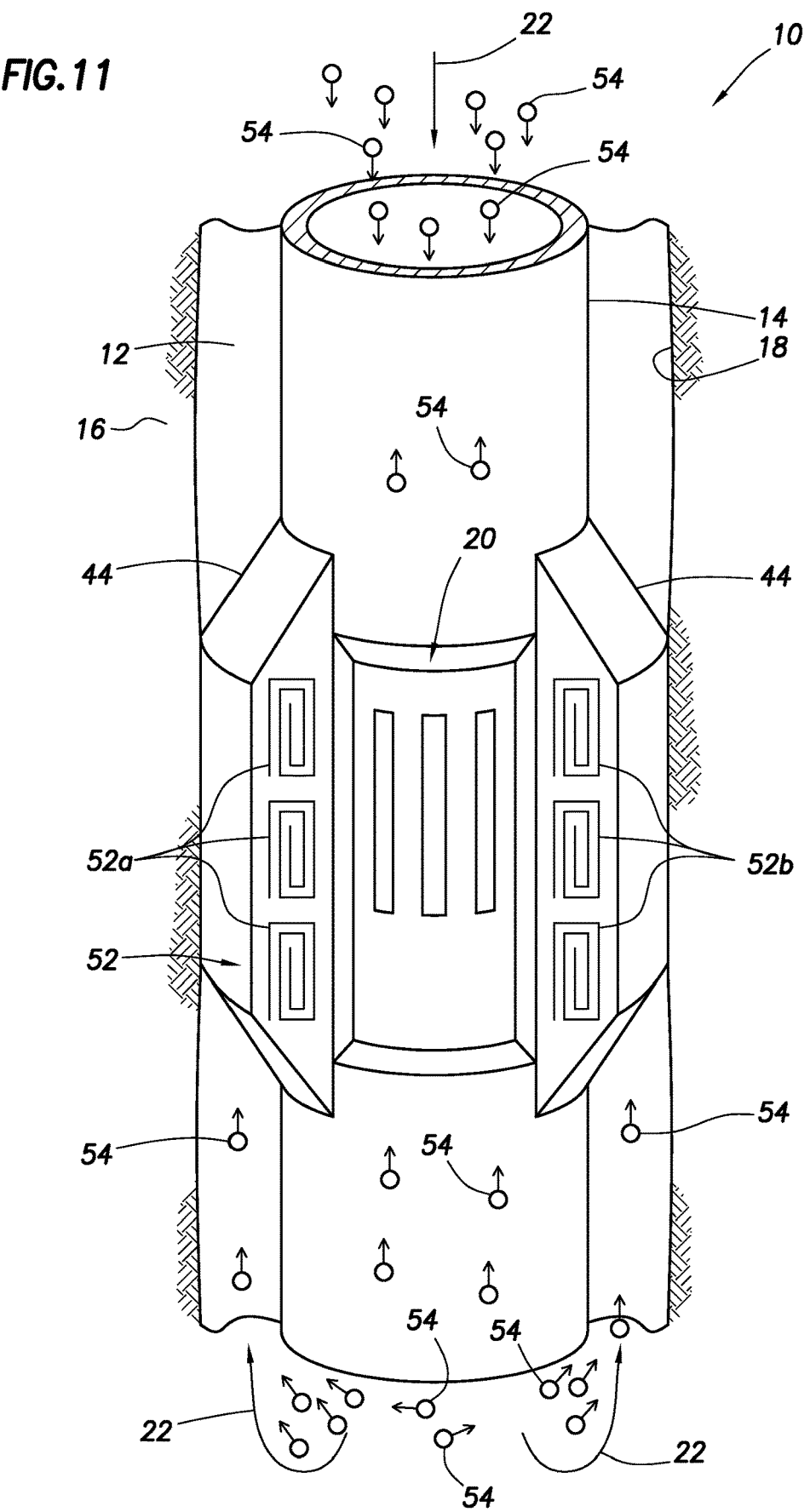
FIG. 11 is a representative partially cross-sectional view of another example of the system, in which radio frequency identification sensors and electromagnetic sensors are used.

Referring additionally now to FIG. 11, an example of the system 10 including RFID sensors 52 and EM sensors 20 is representatively illustrated. In this example, the RFID sensors 52 are positioned in the centralizers 44, and the EM sensors 20 are positioned on the casing 14 between the centralizers. However, other sensor positions may be used, in keeping with the principles of this disclosure.

Fluid-specific RFID tags 54 (radio frequency identifiable elements) are mixed with the fluids 22 (such as, drilling fluid 24, spacer fluid 26, cement 28, etc.), and are pumped through the casing 14 and into the annulus 12 formed between the casing and the formation 16. Characteristics of the RFID tags 54 are sensed by the RFID sensors 52, thereby identifying the fluid types associated with the RFID tags. Concurrently, the EM sensors 20 measure the dielectric properties of the fluids 22. Different fluid types will have corresponding different RFID tags 54 mixed therewith, and the different fluid types will also have corresponding different dielectric properties.

In this example, the RFID sensor 52 detects RFID tags 54 added to the fluids 22 and transported into the well. The RFID tags 54 may be passive or active tags with properties (e.g., resonant frequencies) unique to the fluid to which they are added. When interrogated via the RFID sensor 52, the RFID tags 54 yield information as to the fluid type.

The EM sensor 20 measures the dielectric properties of the fluids 22 proximate the EM sensor. In some embodiments, the EM sensor 20 operates by measuring the broadband impedance, S-parameters, or voltages or currents at electrodes 40 (see FIG. 2) in the presence of fluids 22. As different fluids have different dielectric properties, the measured broadband impedance and/or S-responses of the electrodes 40 change as one fluid is displaced with another fluid.

In some examples, the sensors 20, 52 can transmit, receive, process and telemeter EM and RFID data to the telemetry unit 30. Identification of fluid type can be performed downhole (e.g., at the sensors 20, 52) or uphole (e.g., at the computer 32 and/or one or more computers at a remote location).

Independent analyses of RFID and EM sensor data is described above. Given a commonality of the fluids 22 measured by the different sensors, there is an opportunity to jointly invert their respective data to improve confidence in the resultant models. This disclosure accordingly provides a process of jointly inverting multi-modal data for a common fluid model.

Common Fluid Model

The distribution of fluids in the annulus 12 can be assumed to be piecewise continuous. For example, a three-dimensional (3D) model in cylindrical coordinates can be constructed as the juxtaposition of volume elements (e.g., tetrahedrals or hexahedrals) populated by fluids.

Each fluid may be assigned physical properties, such as dielectric permittivity, conductivity, permeability, density, acoustic velocity, etc. The assigned physical properties may be defined with a mean value and corresponding standard deviation.

Some properties of a fluid can be enhanced via additives that modify physical property contrast. For example, the cure state of cement (and thus time-lapse changes in conductivity and dielectric permittivity) can be manipulated via chemical additives. As another example, magnetic nanoparticles can increase the bulk magnetic permeability of a fluid.

Some of the physical properties of the fluids 22 may be measured a priori. Multiple measurements can be made to build a statistically significant mean and standard deviation of the physical properties. For example, the dielectric permittivity and conductivity can be measured near a wellhead and before the fluids 22 enter the well with a dielectric probe and analyzer.

Some properties of a fluid, such as dielectric permittivity and conductivity, can be assumed to be isotropic.

For RFID sensing, RFID tags 54 with different characteristics (e.g., resonant frequency or modulated-backscattering by identification number) may be assigned to respective different fluids. This enables fluid discrimination based on RFID tag detection.

For EM sensing, EM sensors 20 are sensitive to changes in electrical properties of the fluids proximate the sensors.

Modeling—RFID Sensor Data

As described above, the magnetic field measured by the RFID sensor system can be expressed as:

$$H^t(r) = i\omega\mu \int_V G_H(r',r) \cdot \lambda(r) B^p(r) d^3r. \quad (80)$$

where $G_H(r',r)$ is a body-to-receiver magnetic Green's functions, $B^p(r)$ is the primary field induction due to the RFID sensor's transmitter 52a, and $\lambda(r)$ is a scalar approximation of the magnetization tensor which assumes the magnetic moment per unit volume of the RFID tag 54 is linearly proportional to the primary magnetic inductance:

$$M_t(r) = \lambda(r) B^p(r), \quad (81)$$

The Green's functions and primary field induction can be evaluated numerically with computational full-wave EM solvers e.g. finite-element (FE) or finite-difference (FD) or integral equation methods, or their hybrids.

Following equation (80), the sensitivities (or Fréchet derivatives or Jacobians) of the magnetic fields due to the RFID tags is given by the differentiation of equation (80):

$$\frac{\partial H^t(r')}{\partial \lambda(r)} = i\omega\mu \int_V G_H(r',r) \cdot B^p(r) d^3r, \quad (82)$$

which, for a discrete element of the model, has the form:

$$\frac{\partial H^t(r')}{\partial \lambda_j(r)} = i\omega\mu \int_{V_j} G_H(r',r) \cdot B^p(r) d^3r, \quad (83)$$

The sensitivities can be assembled into a sensitivity matrix J, which has the elements:

$$J_{k,j} = \frac{\partial H_k^t(r')}{\partial \lambda_j(r)}. \quad (84)$$

Since each fluid may be assigned an RFID tag 54 with a unique characteristic (e.g., resonant frequency), multi-frequency RFID measurements can enable the detection of one or more fluids. By definition, equations (83) and (84) are unique to each fluid type. Inversion based on equations (83) and (84) is intended to locate the position of the RFID tags 54 (and by proxy, their corresponding fluids) in the annulus 12.

With minor modification, the above formulation also applies to the responses and sensitivities for capacitive RFID tag systems.

Modeling—EM Sensor Data

As described above, the EM sensor 20 operates by measuring the broadband impedance and/or S responses of electrodes 40 in the presence of fluids 22. As different fluids have different dielectric properties, the measured broadband impedance and/or S-responses change as one fluid is displaced with another fluid. Hence, the EM data is subject to a time-lapse analysis for which the difference between the S-parameters at two time intervals can be calculated:

$$\Delta S^k(r') = S^k(r',t+\Delta t) - S^k(r',t) = T_k E^k(r',t+\Delta t) - T_k E^k(r',t). \quad (85)$$

where $T_k$ is a transfer function that relates the electric fields $E^k$ to the S-parameters $S^k$.

The time-lapse EM response can be written as:

$$\Delta S^k(r') = T_k \int_V G_k(r',r) \cdot \Delta\hat{\sigma}_a(r) E_b(r) d^3r, \quad (86)$$

where $G_k(r',r)$ is a body-to-receiver electric Green's function, $E_b(r)$ is the primary electric field due to the EM sensor's transmitter 52a, and $\Delta\hat{\sigma}_a$ is the change in anomalous conductivity. Equation (86) is based on a Born approximation, and can alternatively be based on linearized or nonlinear integral equations.

The Green's functions and primary electric field can be evaluated numerically with computational full-wave EM solvers, e.g., finite-element (FE) or finite-difference (FD) or integral equation methods, or their hybrids.

Following equation (86), the sensitivities (or Fréchet derivatives or Jacobians) of the change in S-parameters and the time-lapse change in conductivity is given by the differentiation of equation (86):

$$\frac{\partial \Delta S^k(r\prime)}{\partial \Delta \hat{\sigma}_a(r)} = T_k \int_V G_k(r', r) \cdot E_b(r) d^3 r. \quad (87)$$

In the derivation of equation (86), we have expressed the anomalous conductivity as:

$$\Delta \hat{\sigma}_a(r) = \Delta \sigma_a(r) + i\omega \Delta \in_a(r), \quad (88)$$

such that we have the partial derivative:

$$\frac{\partial \Delta \hat{\sigma}_a(r)}{\partial \Delta \in_a(r)} = i\omega, \quad (89)$$

and we can calculate the sensitivities with respect to permittivity via the chain rule:

$$\frac{\partial \Delta S^k(r\prime)}{\partial \Delta \in_a(r)} = \frac{\partial \Delta \hat{\sigma}_a(r)}{\partial \Delta \in_a(r)} \times \frac{\partial \Delta S^k(r\prime)}{\partial \Delta \hat{\sigma}_a} = i\omega \frac{\partial \Delta S^k(r\prime)}{\partial \Delta \hat{\sigma}_a}, \quad (90)$$

We do this since there is a greater dynamic range in the dielectric permittivity of the fluids than in the conductivity of the fluids. Note that we are at liberty to set the background permittivity formed between the annulus between the casing and the formation to be 1, such that the anomalous permittivity $\Delta \in_a$ is equal to the dielectric constant of the fluid.

Since each fluid has distinct electrical properties, multi-frequency dielectric measurements can enable the detection of one or more fluids. Inversion based on equations (86) and (91) can be used to locate the positions of different fluids in the annulus 12 formed between the casing 14 and the formation 16.

Joint Inversion

Equations (83) and (84) describe the RFID responses and sensitivities for a fluid model characterized by discrete RFID tags 54. Equations (86) and (91) describe the EM responses and sensitivities for a fluid model characterized by discrete physical properties.

There may exist non-uniqueness in the models recovered from either RFID or EM sensing alone. To this end, it is desirable to jointly invert RFID and EM data for a common fluid model. Following Jupp and Vozoff (1975), we can:
Assemble the observed RFID and EM data in a single vector of data, d;
Assemble the RFID and EM model parameters in a single vector of model parameters, m;
Assemble the predicted RFID and EM data in a vector of predicted data, which has the functional form A(m) where A is the (generally) nonlinear forward operator; and
Assemble the RFID and EM sensitivities in a sensitivity matrix J.

We can then avoid constructing a stabilizing functional per Tikhonov regularization. Rather, we can simply truncate the Taylor series for a perturbation about the vector of model parameters:

$$d = A(m) + J\Delta m, \quad (92)$$

such that we solve for the vector of model parameter updates Δm via the generalized inverse of the sensitivity matrix:

$$\Delta m = J^+[d - A(m)] = J^+ r, \quad (93)$$

where r is the vector of residual errors.

The most stable and efficient manner of evaluating the generalized inverse of the sensitivity matrix is via singular value decomposition (SVD). As per Jupp and Vozoff (1975), stability can be enforced via damping of the singular values. This method is particularly advantageous as it explicitly avoids constructing a stabilizing functional and selecting a regularization parameter. Rather, stability is enforced by damping contributions from irrelevant model parameters (i.e., those with small singular values). The damping conditions can be preset to eliminate the need for user intervention.

Data and model weights can be applied to equation (91) such that the dynamic range of the data and model weights are decreased for improved inversion performance. An advantage of this inversion method is that it enforces a common fluid model on both the RFID and EM data.

In practice, we can apply this inversion to multiple frequencies. The frequencies may be pre-selected on a priori knowledge of their sensitivity to specific fluids.

Other Considerations

The formation resistivity required for computing the Green's functions and background EM fields can be known a priori from drilling (e.g., LWD resistivity logs) or open-hole wireline logging (e.g., laterolog tools, induction tools, multi-component induction tools, propagation tools, dielectric logs, etc.) in the wellbore 18.

The background EM fields and Green's functions for a number of background conductivity models (inclusive of casing equipment geometry and complexity, sensors, formation resistivity, etc.) can be pre-calculated, stored, and interrogated via a look-up table or interpolation function (e.g., splines) using any appropriate numerical solver. Data entries in the look-up table can be interrogated using efficient computational search techniques and algorithms such as binary or hash search. This enables the method to be applied without needing successive background model computations.

The method can be generalized to other sensor types. The dimensionality of the fluid model (e.g., 1D, 2D, 3D) is based on the interpreter's preference and/or requirement for solving particular monitoring problems.

The disclosed method can be incorporated into software which may be programmed on serial and/or parallel processing architectures. The processing and related functions may be performed remotely from the well (e.g., cloud computers), whereby computers at the well site are connected to the remote processing computers via a network. The computers at the well site would not in that case require high computational performance, and subject to network reliability, all modeling, inversion, and/or imaging can effectively be done in real time.

The disclosed method can be applied directly to invert both RFID and EM data for the fluid type that is present in the annulus 12. The method can ensure a rapid inverse solution that doesn't require successive, computationally intensive forward modeling runs with advanced numerical solvers.

The above disclosure provides workflows for jointly inverting multi-modal data to identify a type of fluid in the annulus 12. The workflows can minimize user intervention when setting and changing inversion parameters.

The workflows can be performed downhole, enabling the telemetry of a fluid model, rather than (or in addition to) RFID and EM data.

It may now be fully appreciated that the system 10 and method examples described above provide significant advancements to the art of characterizing fluids in a well annulus.

More specifically, a method 50 for use with a subterranean well is provided to the art by the above disclosure. In one example, the method 50 comprises: modeling multiple fluid types in an annulus 12 formed between casing 14 and an earth formation 16 penetrated by a wellbore 18; calculating predicted data based on the modeling and physical properties of the respective fluid types; acquiring observed data indicative of at least one physical property associated with an actual fluid 22, 24, 26 and/or 28 in the well annulus 12; comparing the predicted data to the acquired data; and selecting at least one of the fluid types for the fluid based on the comparing.

The modeling step can comprise determining a response of each of the fluid types to electromagnetic impulses.

The physical property can comprise a dielectric property of the actual fluid 22, 24, 26, 28.

The physical property can comprise a magnetic inductance of a radio frequency identification tag 54 in the actual fluid 22, 24, 26, 28.

The fluid types may be selected from the group consisting of drilling fluid 24, spacer fluid 26 and cement 28.

The acquiring step can comprise acquiring the observed data at multiple discrete times.

The "at least one" physical property may comprise both a dielectric property of the actual fluid 22, 24, 26, 28 and a magnetic inductance of a radio frequency identification tag 54 in the actual fluid.

A system 10 for use with a subterranean well is also provided to the art by the above disclosure. In one example, the system 10 can comprise: multiple sensors 20 and/or 52 longitudinally spaced apart along a casing 14 in a wellbore 18, each of the sensors imparting electromagnetic impulses to a fluid 22, 24, 26 and/or 28 present in an annulus 12 formed between the casing 14 and the wellbore 18, and each of the sensors providing observed data indicative of at least one physical property associated with the fluid.

The system 10 may comprise a computer 32 that calculates predicted data based on a model and physical properties of respective multiple fluid types. The computer 32 also compares the predicted data to the acquired data. The computer 32 may select at least one of the fluid types for the fluid based on the comparison of the predicted data to the acquired data.

The sensors 20, 52 may be positioned on the casing 14 and/or on a centralizer 44.

The physical property can comprise a dielectric property of the fluid 22, 24, 26, 28 and/or a magnetic inductance.

Another method 50 for use with a subterranean well is also described above. In one example, the method 50 can comprise: modeling multiple fluid types in an annulus 12 formed between casing 14 and an earth formation 16 penetrated by a wellbore 18; inverting electromagnetic data acquired by sensors 20 and/or 52 in the well; and selecting at least one of the fluid types based on the inverting.

The electromagnetic data may comprise time-lapse electromagnetic data.

The inverting step can include inverting the electromagnetic data for a change in fluid conductivity and/or a change in a fluid dielectric property.

The electromagnetic data may comprise multiple modes in the data, and the inverting step can include inverting the multiple modes of the electromagnetic data for a common fluid model. The multiple modes of the electromagnetic data can comprise indications of a fluid dielectric property and indications of a magnetic inductance of a radio frequency identification tag in a fluid 22, 24, 26 and/or 28.

A method for use with a subterranean well can comprise: deploying at least one sensor system in a fluid-filled annulus formed between casing and a formation penetrated by a wellbore; acquiring observed data indicative of at least one physical property associated with at least one fluid occupying the annulus; generating predicted data by modeling a response of the sensor system due to a physical property model that simulates the at least one fluid occupying the annulus; determining differences between the observed data and the predicted data; adjusting the physical property model such that the differences between the observed data and the predicted data satisfy a convergence criteria, thereby generating an updated physical property model; and controlling wellbore operations according to the updated physical property model.

The operations may be selected from the group consisting of well construction, well operations and well abandonment.

The sensor system may transmit and receive electromagnetic fields.

The at least one fluid occupying the annulus may be selected from the group consisting of drilling fluid, spacer fluid and cement.

The at least one physical property associated with the at least one fluid occupying the annulus, and parameterized in the physical property model, may comprise a complex dielectric constant.

The at least one physical property associated with the at least one fluid occupying the annulus, and parameterized in the physical property model, may comprise a magnetization.

The acquiring step can comprise acquiring the observed data using a plurality of the sensor systems at more than one position in the annulus arranged longitudinally and/or azimuthally.

The acquiring step can comprise acquiring the observed data at at least two discrete times. These may be time-lapse measurements. The discrete times can span a life of the well, e.g., from spudding to abandonment.

The step of controlling wellbore operations may comprise monitoring curing of cement.

The step of controlling wellbore operations may comprise monitoring invasion of formation fluids.

The step of controlling wellbore operations may comprise facilitating or controlling targeted treatment to select the well operations before, during and after cement curing.

The step of controlling wellbore operations may comprise facilitating or controlling smart or "intelligent" completions.

A system for use with a subterranean well can comprise: at least two sensor systems azimuthally spaced around and longitudinally spaced apart along a casing in a wellbore. Each of the sensor systems transmits electromagnetic signals, and each of the sensor systems receives the electromagnetic signals. Each of the sensor systems generates observed data as a transfer function of the received and transmitted electromagnetic signals with sensitivity to a physical property of fluids present in an annulus formed between the casing and the wellbore, and each of the sensor systems communicates the observed data to a computer.

The electromagnetic signals may be transmitted from one position and received at one or more positions. The electromagnetic signals may have one or more frequencies.

The computer may calculate predicted data based on a physical property model, and the computer may compare the predicted data to the observed data.

The observed data may be acquired at at least two discrete times.

The sensor systems may be positioned on the casing and/or on a centralizer.

The sensor systems may comprise antennas selected from the group consisting of electrodes, microstrips and coils.

The sensor systems may comprise radio frequency tags.

The physical property may comprise a relative complex dielectric constant and/or a change in a relative complex dielectric constant.

The physical property may comprise magnetization and/or a change in relative magnetization.

The sensor systems may generate the observed data for different types of the transmitted and received electromagnetic signals. The different types may include fluid identification and RFID signals The computer may perform a joint inversion of the observed data for the different types of the transmitted and received electromagnetic signals. This may include joint inversion for fluid identification and RFID signals.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method for use with a subterranean well, the method comprising:
   deploying at least one sensor system in a fluid-filled annulus formed between casing and a formation penetrated by a wellbore;
   acquiring observed data indicative of at least one physical property associated with at least one fluid occupying the annulus;
   generating a fluid model that simulates the at least one fluid occupying the annulus;
   generating predicted data by modeling a response of the sensor system to the at least one fluid occupying the annulus via a dielectric model that is based on the fluid model;
   determining differences between the observed data and the predicted data;
   adjusting the dielectric model such that the differences between the observed data and the predicted data satisfy a convergence criteria, thereby generating an updated dielectric model;
   updating the fluid model based on the updated dielectric model; and
   controlling wellbore operations according to the updated fluid model.

2. The method of claim 1, wherein the operations are selected from the group consisting of well construction, well operations and well abandonment.

3. The method of claim 1, wherein the sensor system transmits and receives electromagnetic fields.

4. The method of claim 1, wherein the at least one fluid occupying the annulus is selected from the group consisting of drilling fluid, spacer fluid and cement.

5. The method of claim 1, wherein the at least one physical property associated with the at least one fluid occupying the annulus, and parameterized in the fluid model, comprises a complex dielectric constant.

6. The method of claim 1, wherein the at least one physical property associated with the at least one fluid occupying the annulus, and parameterized in the fluid model, comprises a magnetization.

7. The method of claim 1, wherein the acquiring further comprises acquiring the observed data using a plurality of the sensor systems at more than one position in the annulus arranged at least one of the group consisting of longitudinally and azimuthally.

8. The method of claim 1, wherein the acquiring further comprises acquiring the observed data at least two discrete times.

9. The method of claim 1, wherein controlling wellbore operations comprises monitoring curing of cement.

10. The method of claim 1, wherein controlling wellbore operations comprises monitoring invasion of formation fluids.

11. The method of claim 1, wherein controlling wellbore operations comprises facilitating or controlling targeted treatment to select the well operations before, during and after cement curing.

12. The method of claim 1, wherein controlling wellbore operations comprises facilitating or controlling smart completions.

13. A system for use with a subterranean well, the system comprising:
- at least two sensor systems azimuthally spaced around and longitudinally spaced apart along a casing in a wellbore and wherein:
- each of the sensor systems transmits electromagnetic signals;
- each of the sensor systems receives the electromagnetic signals;
- each of the sensor systems generates observed data as a transfer function of the received and transmitted electromagnetic signals with sensitivity to a physical property of fluids present in an annulus formed between the casing and the wellbore; and
- each of the sensor systems communicates the observed data to a computer, wherein the computer:
  - creates a fluid model that simulates the physical property of the fluids present in the annulus;
  - generates predicted data by modeling a response of the sensor system to the at least one fluid occupying the annulus via a dielectric model that is based on the fluid model;
  - compares the predicted data to the observed data;
  - adjusts the dielectric model such that the differences between the observed data and the predicted data satisfy a convergence criteria, thereby generating an updated dielectric model; and
  - updates the fluid model based on the updated dielectric model.

14. The system of claim 13, wherein the observed data is acquired at least two discrete times.

15. The system of claim 13, wherein the sensor systems are positioned on the casing.

16. The system of claim 13, wherein the sensor systems are positioned on a centralizer.

17. The system of claim 13, wherein the sensor systems comprise antennas selected from the group consisting of electrodes, microstrips, and coils.

18. The system of claim 13, wherein the sensor systems comprise radio frequency tags.

19. The system of claim 13, wherein the physical property comprises at least one of the group consisting of a relative complex dielectric constant and a change in a relative complex dielectric constant.

20. The system of claim 13, wherein the physical property comprises at least one of the group consisting of magnetization and a change in relative magnetization.

21. The system of claim 13, wherein the sensor systems generate the observed data for different types of the transmitted and received electromagnetic signals.

22. The system of claim 21, wherein the computer performs a joint inversion of the observed data for the different types of the transmitted and received electromagnetic signals.

* * * * *